(12) United States Patent
Kato et al.

(10) Patent No.: US 11,017,280 B2
(45) Date of Patent: May 25, 2021

(54) AUXILIARY ANTENNA, RFID SYSTEM, AND METHOD FOR READING RFID TAG

(71) Applicant: Murata Manufacturing Co., Ltd., Nagaokakyo (JP)

(72) Inventors: Noboru Kato, Nagaokakyo (JP); Ryohei Omori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 157 days.

(21) Appl. No.: 16/286,799

(22) Filed: Feb. 27, 2019

(65) Prior Publication Data
US 2019/0188547 A1   Jun. 20, 2019

Related U.S. Application Data

(63) Continuation of application No. PCT/JP2017/040766, filed on Nov. 13, 2017.

(30) Foreign Application Priority Data

Dec. 2, 2016 (JP) .............................. JP2016-235369
Jan. 25, 2017 (JP) .............................. JP2017-011571
Feb. 28, 2017 (JP) .............................. JP2017-035832

(51) Int. Cl.
*G06K 19/067* (2006.01)
*H01Q 7/00* (2006.01)
(Continued)

(52) U.S. Cl.
CPC ..... *G06K 19/0672* (2013.01); *G06K 7/10297* (2013.01); *G06K 19/07786* (2013.01); 
(Continued)

(58) Field of Classification Search
CPC ......... G06K 19/07794; G06K 19/0672; G06K 19/07786; H01Q 7/00; H01Q 1/2208
See application file for complete search history.

(56) References Cited

U.S. PATENT DOCUMENTS 3,938,044 A * 2/1976 Lichtblau ........... G08B 13/2411
                                                                340/572.3
7,503,509 B2 * 3/2009 Aramaki .......... G06K 19/07749
                                                                235/380
(Continued)

FOREIGN PATENT DOCUMENTS

JP    2002151944 A    5/2002
JP    2004343410 A    12/2004
(Continued)

OTHER PUBLICATIONS

International Search Report issued for PCT/JP2017/040766 dated Dec. 19, 2017.
(Continued)

*Primary Examiner* — Thien M Le
*Assistant Examiner* — Asifa Habib
(74) *Attorney, Agent, or Firm* — Arent Fox LLP

(57) ABSTRACT

An auxiliary antenna is provided that enables communication between a small antenna of an RFID tag and an antenna of a reader device without using a small antenna as the antenna of the reader device. The auxiliary antenna is an auxiliary antenna configured to expand a communication range of an antenna of an RFID tag to enable communication between the small antenna included in the RFID tag and an antenna included in a reader device. The auxiliary antenna includes a resonance loop group in which a plurality of resonance loops having a resonance frequency corresponding to a communication frequency is arranged to be coupled through a magnetic field. Moreover, the resonance loop group has an antenna area larger than the antenna area of the antenna of the RFID tag and equivalent to or larger than the antenna area of the antenna of the reader device.

20 Claims, 23 Drawing Sheets

(51) Int. Cl.
*H01Q 19/02* (2006.01)
*G06K 19/077* (2006.01)
*H04B 5/00* (2006.01)
*H01Q 1/22* (2006.01)
*G06K 7/10* (2006.01)
*H01Q 9/06* (2006.01)
*H01Q 21/06* (2006.01)

(52) U.S. Cl.
CPC ..... G06K 19/07794 (2013.01); H01Q 1/2208 (2013.01); H01Q 1/2216 (2013.01); H01Q 1/2225 (2013.01); H01Q 7/00 (2013.01); H01Q 9/06 (2013.01); H01Q 19/02 (2013.01); H01Q 21/061 (2013.01); H04B 5/0062 (2013.01); *H01Q 21/06* (2013.01)

(56) References Cited

U.S. PATENT DOCUMENTS

| | | | | |
|---|---|---|---|---|
| 7,696,884 | B2 * | 4/2010 | Luo | G06K 7/10178 340/572.7 |
| 8,179,332 | B2 * | 5/2012 | Kubo | H01Q 7/06 343/788 |
| 8,564,472 | B2 | 10/2013 | Okamura et al. | |
| 8,982,008 | B2 * | 3/2015 | Parsche | H01Q 1/243 343/866 |
| 9,496,220 | B2 * | 11/2016 | Nakashiba | H01L 23/5227 |
| 9,710,681 | B2 * | 7/2017 | Akiyama | H04B 5/0031 |
| 10,483,623 | B2 * | 11/2019 | Ito | H01Q 1/243 |
| 10,587,312 | B1 * | 3/2020 | Jao | H04B 15/02 |
| 2002/0053992 | A1 * | 5/2002 | Kawakami | H01Q 1/48 343/767 |
| 2005/0212707 | A1 * | 9/2005 | Egbert | H01Q 1/2225 343/702 |
| 2007/0139285 | A1 * | 6/2007 | Maruyama | H01Q 7/00 343/741 |
| 2009/0091501 | A1 * | 4/2009 | Mizoroki | G06K 19/07767 343/702 |
| 2009/0231223 | A1 * | 9/2009 | Laronda | H01Q 7/005 343/748 |
| 2009/0249611 | A1 * | 10/2009 | Hanhikorpi | G06K 19/0775 29/601 |
| 2010/0052992 | A1 | 3/2010 | Okamura et al. | |
| 2010/0245049 | A1 * | 9/2010 | Yoshida | H01Q 9/16 340/10.1 |
| 2012/0206239 | A1 | 8/2012 | Ikemoto | |
| 2015/0180552 | A1 * | 6/2015 | Konanur | H04B 5/0087 455/41.1 |
| 2016/0118711 | A1 * | 4/2016 | Finn | H01Q 1/2283 343/867 |
| 2020/0034678 | A1 * | 1/2020 | Yazaki | G06K 19/0723 |

FOREIGN PATENT DOCUMENTS

| | | |
|---|---|---|
| JP | 2005277983 A | 10/2005 |
| JP | 2006093977 A | 4/2006 |
| JP | 2007143132 A | 6/2007 |
| JP | 5370581 B2 | 12/2013 |

OTHER PUBLICATIONS

Written Opinion of the International Searching Authority issued for PCT/JP2017/040766 dated Dec. 19, 2017.

* cited by examiner

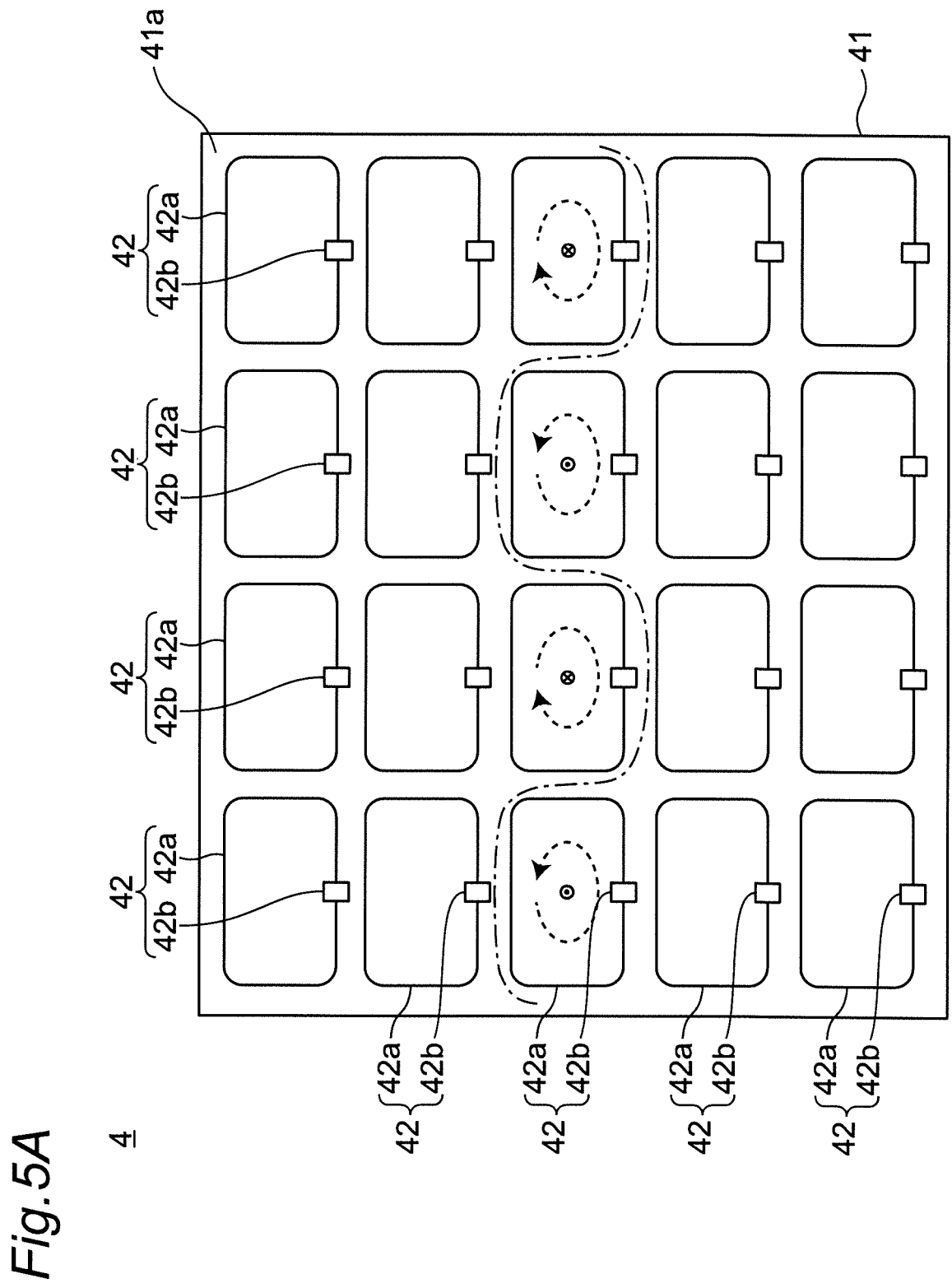

AUXILIARY ANTENNA, RFID SYSTEM, AND METHOD FOR READING RFID TAG

CROSS-REFERENCE TO RELATED APPLICATIONS

The present application is a continuation of PCT/JP2017/040766 filed Nov. 13, 2017, which claims priority to Japanese Patent Application No. 2017-035832, filed Feb. 28, 2017, Japanese Patent Application No. 2017-011571, filed Jan. 25, 2017, and Japanese Patent Application No. 2016-235369, filed Dec. 2, 2016, the entire contents of each of which are incorporated herein by reference.

TECHNICAL FIELD

The present disclosure relates to an auxiliary antenna, an RFID system, and a method for reading an RFID tag making an RFID tag having a small antenna readable.

BACKGROUND

Article management using RFID tags is recently used in various fields. For example, RFID tags are embedded in articles such as soles of shoes to perform the article management.

RFID tags embedded in articles require smaller and smaller sizes. Therefore, it is required to use small (or very small) antennas as antennas included in the RFID tags.

However, if a small antenna is used for an RFID tag, it is difficult for a field emission type antenna (e.g., a patch antenna or a dipole antenna) included in a general reader device used in a store, or the like, to communicate with the small antenna (e.g., amagnetic field antenna ora small dipole antenna having a magnetic field generating part formed by adding a loop part). Therefore, the reader device may be unable to read information of the RFID tag. Even if the reader device can read the information of the RFID tag, a time is required for finding a position where an antenna of the reader device can communicate with the antenna of the RFID tag.

In this regard, Patent Document 1 discloses that a small loop antenna (magnetic field antenna) having substantially the same antenna area as a small antenna (magnetic field antenna) of an RFID tag is used as an antenna of a reader device.

Patent Document 1: Japanese Patent No. 5370581.

However, in the configuration of Patent Document 1, the antenna used for the reader device is limited to the magnetic field antenna, and therefore, a general reader device cannot be used, so that a special reader device corresponding to a small RFID tag must be prepared.

SUMMARY OF THE INVENTION

Thus, it is an object of the present disclosure is to provide an auxiliary antenna, an RFID system, and a method for reading an RFID tag enabling communication between a small antenna of an RFID tag and an antenna of a reader device without using a small antenna as the antenna of the reader device.

Thus, an auxiliary antenna according to the present disclosure is configured to expand a communication range of an antenna of an RFID tag to enable communication between the small antenna included in the RFID tag and an antenna included in a reader device. In this aspect, the auxiliary antenna includes a resonance loop group in which a plurality of resonance loops having a resonance frequency corresponding to a communication frequency is arranged to be coupled through a magnetic field. In addition, the resonance loop group has an antenna area larger than the antenna area of the antenna of the RFID tag and equivalent to or larger than the antenna area of the antenna of the reader device.

Moreover, an RFID system according to the present disclosure is configured as an RFID system that includes an RFID tag including a small antenna; a reader device including an antenna; and an auxiliary antenna expanding a communication range of the antenna of the RFID tag to enable communication between the antenna included in the RFID tag and the antenna included in the reader device. In this aspect, the auxiliary antenna includes a resonance loop group in which a plurality of resonance loops having a resonance frequency corresponding to a communication frequency is arranged to be coupled through a magnetic field. Moreover, the resonance loop group has an antenna area larger than the antenna area of the antenna of the RFID tag and equivalent to or larger than the antenna area of the antenna of the reader device.

Yet further, an RFID system according to the present disclosure is configured as an RFID system that includes an RFID tag including a magnetic field antenna; a reader device including an electric field antenna; and an auxiliary antenna disposed near the RFID tag so as to allow communication between the magnetic field antenna included in the RFID tag and the electric field antenna included in the reader device. In this aspect, the auxiliary antenna includes a plurality of resonance loops having a resonance frequency corresponding to a communication frequency, and the plurality of resonance loops is arranged to have a length in an arrangement direction thereof equal to or greater than ¼ wavelength of the communication frequency.

Moreover, a method for reading an RFID tag according to the present disclosure includes preparing an auxiliary antenna including a resonance loop group in which a plurality of resonance loops having a resonance frequency corresponding to a communication frequency is arranged to be coupled through a magnetic field, where the resonance loop group has an antenna area larger than the antenna area of the antenna of the RFID tag and equivalent to or larger than an antenna area of an antenna of a reader device. The method further includes bringing the auxiliary antenna and the reader device closer to the RFID tag and expanding a communication range of the antenna of the RFID tag by the auxiliary antenna to allow communication between the antenna of the RFID tag and the antenna of the reader device.

According to the present disclosure, communication range can be increased between the small antenna of the RFID tag and the antenna of the reader device without using a small antenna as the antenna of the reader device.

BRIEF DESCRIPTION OF DRAWINGS

FIG. 5A is a plan view of the auxiliary antenna of FIG. 1.

DETAILED DESCRIPTION

Figure 1:
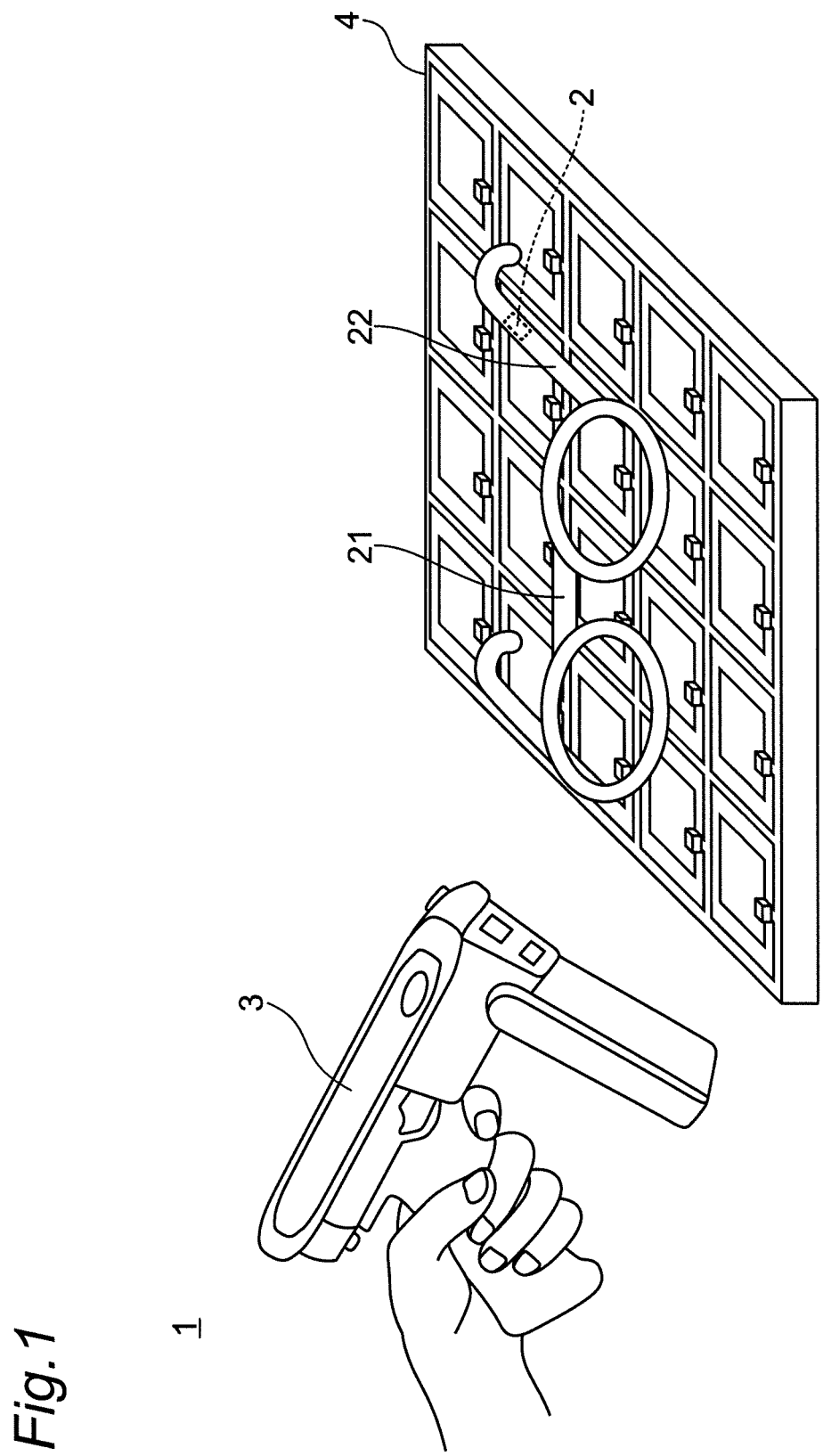
FIG. 1 is a perspective view of an RFID system according to an embodiment of the present disclosure.

An auxiliary antenna according to an aspect of the present disclosure is configured as an auxiliary antenna expanding a communication range of an antenna of an RFID tag to enable communication between the small antenna included in the RFID tag and an antenna included in a reader device. In this aspect, the auxiliary antenna includes a resonance loop group in which a plurality of resonance loops having a resonance frequency corresponding to a communication frequency is arranged to be coupled through a magnetic field, with an antenna area larger than the antenna area of the antenna of the RFID tag and equivalent to or larger than the antenna area of the antenna of the reader device.

With this configuration, the plurality of resonance loops is magnetically coupled to each other to expand the communication range of the antenna of the RFID tag so that communication can be enabled between the small antenna of the RFID tag and the antenna of the reader device. Therefore, the necessity of using a small antenna as the antenna of the reader device can be eliminated.

Preferably, a plurality of the resonance loops is arranged to have an electric length in an arrangement direction equal to or greater than ¼ wavelength of the communication frequency. While the resonance loops resonate at a predetermined frequency, electric field radiation from each of the resonance loops occurs near the resonance frequency at the same time as magnetic field radiation. By arranging a plurality of the resonance loops radiating the electric field, the resonance loops are coupled through a magnetic field and coupled through an electric field, so that the individual magnetic field antennas form a large electric field antenna as a whole. Particularly, by arranging the resonance loop group to have ¼ wavelength or more, a plurality of resonance loop groups can be used as an electric field antenna capable of transmitting and receiving electric field signals as a whole. When this electric field antenna is used as an auxiliary antenna, even a small RFID tag coming close to any of the resonance loops of the auxiliary antenna can radiate an electric field and can be read by the electric field antenna of the reader device.

This is because the small RFID tag is formed of an antenna radiating a magnetic field or an antenna having a magnetic field radiating part so that the magnetic field coupling between the antenna of the small RFID tag and the resonance loops enables signal transmission between the antenna of the small RFID tag and the resonance loops. Since the resonance loops are coupled through a magnetic field and coupled through an electric field to each other, the resonance loop group serves as an electric field antenna configured to radiate an electric field as a whole and transmit and receive electric field signals radiated from the electric field antenna of the reader device. Therefore, by receiving the electric field signals radiated from the electric field antenna of the reader device with the auxiliary antenna having a plurality of resonance loops arranged thereon, converting the electric field signals into magnetic field signals by the resonance loops of the auxiliary antenna, and transmitting the magnetic field signals to the magnetic field antenna of the RFID tag, communication with the small RFID tag having a magnetic field antenna is enabled. As a result, the communication range of the antenna of the RFID tag can be expanded to enable communication between the magnetic field antenna of the RFID tag and the electric field antenna of the reader device. The small RFID tag with the auxiliary antenna located in the vicinity thereof can be read by the electric field antenna of the reader device at a long distance, while the RFID tag without the auxiliary antenna located in the vicinity thereof cannot be read from the field antenna at a long distance. Therefore, only the RFID tag desired to be read can be read.

The resonance loop may comprise an LC parallel resonance circuit having a resonance frequency in the UHF band.

Preferably, the resonance loops disposed on the center side in the arrangement direction have a resonance frequency set higher than the resonance loops disposed on the end portion side in the arrangement direction. As a result, variations can be suppressed in the actual resonance frequency of the plurality of resonance loops.

Preferably, a plate-shaped or sheet-shaped main body part is included with the plurality of resonance loops arranged on a first principal surface of the main body part and a second principal surface opposite to the first principal surface with each resonance loop including a loop electrode that is a partially opened annular conductor. Moreover, the plurality of resonance loops is arranged such that when viewed through the main body part in a direction orthogonal to the first principal surface or the second principal surface of the main body part, closed loops are formed by the loop electrodes of the resonance loops on the first principal surface side and the loop electrodes of the resonance loops on the second principal surface side. With this configuration, a capacitor can be formed by a parasitic capacitance, so that the necessity of separately mounting a capacitor on the main body part can be eliminated. As a result, the auxiliary antenna can be reduced in thickness and can also be reduced in cost. Additionally, the durability of the auxiliary antenna can be improved.

Preferably, the plurality of resonance loops has the same or substantially the same inner and outer diameter dimensions and is arranged at regular intervals. This configuration includes the plurality of resonance loops having the same configuration and therefore can eliminate the necessity of positioning the auxiliary antenna at a specific position with respect to the RFID tag or the reader device.

Preferably, the plurality of resonance loops is arranged in a first row or a second row along a first direction, and the resonance loops arranged in the second row are arranged in an offset manner in the first direction so as not to align with the resonance loops arranged in the first row in a second direction orthogonal to the first direction. With this configuration, the magnetic field generated from the auxiliary antenna can be made larger, and the communication range of the antenna of the RFID tag can further be expanded.

An RFID system according to another exemplary aspect of the present disclosure is configured as an RFID system that includes an RFID tag including a small antenna; a reader device including an antenna; and an auxiliary antenna expanding a communication range of the antenna of the RFID tag to enable communication between the antenna included in the RFID tag and the antenna included in the reader device. In this aspect, the auxiliary antenna includes a resonance loop group in which a plurality of resonance loops having a resonance frequency corresponding to a communication frequency is arranged to be coupled through a magnetic field. Moreover, the resonance loop group has an antenna area larger than the antenna area of the antenna of the RFID tag and equivalent to or larger than the antenna area of the antenna of the reader device.

With this configuration, the plurality of resonance loops is magnetically coupled to each other to expand the communication range of the antenna of the RFID tag so that communication can be enabled between the small antenna of the RFID tag and the antenna of the reader device. Therefore, the necessity of using a small antenna as the antenna of the reader device can be eliminated. Additionally, since only the RFID tag with the auxiliary antenna located in the vicinity thereof can be read by the electric field antenna of the reader device, only the RFID tag desired to be read can be read. For example, when a plurality of products are placed on a product table, the RFID tag of the product can be read by bringing the auxiliary antenna closer; however, the RFID tag of the product far from the auxiliary antenna cannot be read even on the same product table. The configuration described above can be used in this way, and only the desired RFID tag can be read by moving the auxiliary antenna.

The antenna of the RFID tag may be a magnetic field antenna, and the antenna of the reader device may be an electric field antenna. With this configuration, a signal wave radiated from the electric field antenna of the reader device is transmitted as an electric field signal to the auxiliary antenna, converted into a magnetic field signal by each of the resonance loops of the auxiliary antenna, and transmitted to the magnetic field antenna of the RFID tag. This enables communication between the reader device and the RFID tag and can eliminate the necessity of using a magnetic field antenna as the reader device.

Preferably, a plurality of the resonance loops is arranged to have an electric length in an arrangement direction equal to or greater than ¼ wavelength of the communication frequency. This configuration enables the whole of the plurality of resonance loops to function as an electric field antenna capable of radiating an electric field, so that a magnetic field signal can be converted into an electric field signal. As a result, the communication range of the antenna of the RFID tag can be expanded to enable communication between the small magnetic field antenna of the RFID tag and the electric field antenna of the reader device.

In an exemplary aspect, the resonance loop may comprise an LC parallel resonance circuit having a resonance frequency in the UHF band.

Preferably, the resonance loops disposed on the center side in the arrangement direction have a resonance frequency set higher than the resonance loops disposed on the end portion side in the arrangement direction. As a result, variations can be suppressed in the actual resonance frequency of the plurality of resonance loops.

Preferably, the auxiliary antenna includes a plate-shaped or sheet-shaped main body part; the plurality of resonance loops is arranged on a first principal surface of the main body part and a second principal surface opposite to the first principal surface and each includes a loop electrode that is a partially opened annular conductor; and the plurality of resonance loops is arranged such that when viewed through the main body part in a direction orthogonal to the first principal surface or the second principal surface of the main body part, closed loops are formed by the loop electrodes of the resonance loops on the first principal surface side and the loop electrodes of the resonance loops on the second principal surface side. With this configuration, a capacitor can be formed by a parasitic capacitance, so that the necessity of separately mounting a capacitor on the main body part can be eliminated. As a result, the auxiliary antenna can be reduced in thickness and can also be reduced in cost. Additionally, the durability of the auxiliary antenna can be improved.

Preferably, the plurality of resonance loops has the same or substantially the same inner and outer diameter dimensions and is arranged at regular intervals. This configuration includes the plurality of resonance loops having the same configuration and therefore can eliminate the necessity of positioning the auxiliary antenna at a specific position with respect to the RFID tag or the reader device.

Preferably, the plurality of resonance loops is arranged in a first row or a second row along a first direction, and the resonance loops arranged in the second row are arranged in an offset manner in the first direction so as not to align with the resonance loops arranged in the first row in a second direction orthogonal to the first direction. With this configuration, the magnetic field generated from the auxiliary antenna can be made larger, and the communication range of the antenna of the RFID tag can further be expanded. This enables the reader device to more reliably read the information of the RFID tag.

An RFID system according to another exemplary aspect of the present disclosure is configured as an RFID system that includes an RFID tag including a magnetic field antenna; a reader device including an electric field antenna; and an auxiliary antenna disposed near the RFID tag so as to allow communication between the magnetic field antenna included in the RFID tag and the electric field antenna included in the reader device. In this aspect, the auxiliary antenna includes a plurality of resonance loops having a resonance frequency corresponding to a communication frequency, and the plurality of resonance loops is arranged to have a length in an arrangement direction thereof equal to or greater than ¼ wavelength of the communication frequency.

This configuration enables the whole of the plurality of resonance loops to function as an electric field antenna capable of radiating an electric field, so that a magnetic field signal can be converted into an electric field signal. As a result, the communication range of the antenna of the RFID tag can be expanded to enable communication between the magnetic field antenna of the RFID tag and the electric field antenna of the reader device.

The resonance loop may comprise an LC parallel resonance circuit having a resonance frequency in the UHF band.

Preferably, the resonance loops disposed on the center side in the arrangement direction have a resonance frequency set higher than the resonance loops disposed on the end portion side in the arrangement direction. As a result, variations can be suppressed in the actual resonance frequency of the plurality of resonance loops.

Preferably, the auxiliary antenna includes a plate-shaped or sheet-shaped main body part; the plurality of resonance loops is arranged on a first principal surface of the main body part and a second principal surface opposite to the first principal surface and each includes a loop electrode that is a partially opened annular conductor; and the plurality of resonance loops is arranged such that when viewed through the main body part in a direction orthogonal to the first principal surface or the second principal surface of the main body part, closed loops are formed by the loop electrodes of the resonance loops on the first principal surface side and the loop electrodes of the resonance loops on the second principal surface side. With this configuration, a capacitor can be formed by a parasitic capacitance, so that the necessity of separately mounting a capacitor on the main body part can be eliminated. As a result, the auxiliary antenna can be reduced in thickness and can also be reduced in cost. Additionally, the durability of the auxiliary antenna can be improved.

Preferably, the plurality of resonance loops has the same or substantially the same inner and outer diameter dimensions and is arranged at regular intervals. This configuration includes the plurality of resonance loops having the same configuration and therefore can eliminate the necessity of positioning the auxiliary antenna at a specific position with respect to the RFID tag or the reader device.

Preferably, the plurality of resonance loops is arranged in a first row or a second row along a first direction, and the resonance loops arranged in the second row are arranged in an offset manner in the first direction so as not to align with the resonance loops arranged in the first row in a second direction orthogonal to the first direction. With this configuration, the magnetic field generated from the auxiliary antenna can be made larger, and the communication range of the antenna of the RFID tag can further be expanded. This enables the reader device to more reliably read the information of the RFID tag.

Preferably, the auxiliary antenna includes two main body parts on which pluralities of resonance loops are arranged such that the closed loops are formed. In this aspect, the plurality of resonance loops has the same or substantially the same inner and outer diameter dimensions and is arranged at regular intervals, and the two main body parts are disposed such that when viewed through in a direction orthogonal to the first principal surface or the second principal surface, the plurality of the resonance loops arranged on one of the main body parts is shifted in a plane direction from the plurality of resonance loops arranged on the other main body part. With this configuration, even if a null point is generated among the plurality of resonance loops arranged on the one main body part, the null point can be eliminated by the plurality of resonance loops arranged of the other main body part. This enables the reader device to more reliably read the information of the RFID tag.

Yet further, a method for reading an RFID tag is disclosed that includes preparing an auxiliary antenna including a resonance loop group in which a plurality of resonance loops having a resonance frequency corresponding to a communication frequency is arranged to be coupled through a magnetic field, with the resonance loop group having an antenna area larger than the antenna area of the antenna of the RFID tag and equivalent to or larger than an antenna area of an antenna of a reader device. The method further includes bringing the auxiliary antenna and the reader device closer to the RFID tag and expanding a communication range of the antenna of the RFID tag by the auxiliary antenna to allow communication between the antenna of the RFID tag and the antenna of the reader device.

According to this method, the plurality of resonance loops is magnetically coupled to each other to expand the communication range of the antenna of the RFID tag so that communication can be enabled between the small antenna of the RFID tag and the antenna of the reader device. Therefore, the necessity of using a small antenna as the antenna of the reader device can be eliminated.

The auxiliary antenna, the RFID system, and the method for reading an RFID tag according to the embodiment will now be described with reference to the accompanying drawings. It is noted that in the drawings, substantially the same members are denoted by the same reference numerals.

(Exemplary Embodiment)

FIG. 1 is a perspective view of an RFID system according to an exemplary embodiment of the present disclosure.

An RFID system 1 according to this embodiment includes an RFID tag 2, a reader device 3, and an auxiliary antenna 4.

The RFID system 1 is a system using the UHF band as a communication frequency band.

In this embodiment, the RFID tag 2 is embedded in a frame 22 of a pair of glasses 21 that is an example of an article.

Figure 2:
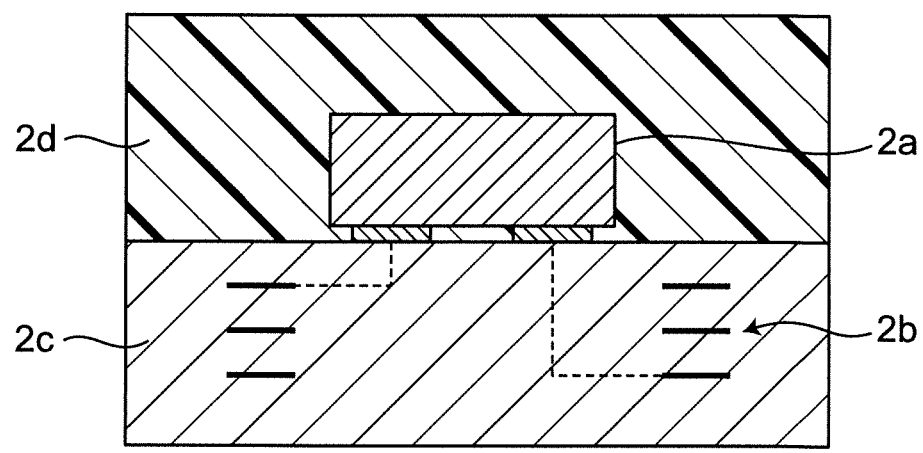
FIG. 2 is a cross-sectional view showing a general configuration of an RFID tag.

FIG. 2 is a cross-sectional view showing a general configuration of the RFID tag 2. As shown in FIG. 2, the RFID tag 2 is a small RFID tag including an RFIC chip 2*b* and a small (or very small) antenna 2*b*. The RFIC chip 2*b* is an element having a circuit, and the like, including memory having identification information of an article stored therein. The RFIC chip 2*b* is mounted on a substrate 2*c* and is electrically connected to an antenna 2*b*. The RFIC chip 2*b* is sealed on the substrate 2c by a sealing resin 2d. The antenna 2b is a minute loop type or coil type magnetic field antenna. The antenna 2b is incorporated in the substrate 2c so that a center axis or a winding axis extends in a thickness direction of the substrate 2c.

Figure 3:
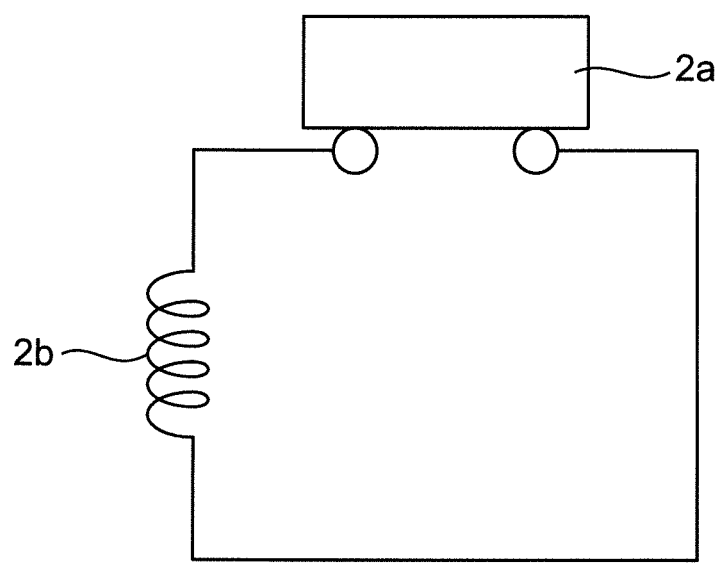
FIG. 3 is an equivalent circuit diagram of the RFID tag of FIG. 2.

FIG. 3 is an equivalent circuit diagram of the RFID tag 2. As shown in FIG. 3, an LC parallel resonance circuit is formed by a capacitive component of the RFIC chip 2b and an inductance component of the antenna 2b.

The RFID tag 2 itself has a communication distance shorter than, for example, an electric field antenna such as a dipole antenna (e.g., 30 cm or less). The antenna 2b of the RFID tag 2 has an outer diameter dimension of 3 mm×3 mm, for example. The antenna 2b of the RFID tag 2 has an antenna area of 0.5 mm$^2$ or more and 50 mm$^2$ or less, for example. For purposes of this disclosure, the "antenna area" refers to an area of an opening of a loop or a coil, i.e., an area of an inner peripheral portion of the loop or the coil.

The reader device 3 is a general stationary type or handheld type reader device used in stores as known to one skilled in the art. In this embodiment, the reader device 3 is a handheld type reader device having a field emission antenna. The reader device 3 transmits a signal and an electric power at the same time. In this embodiment, an antenna of the reader device 3 is, for example, an electric field antenna such as a patch antenna. The antenna of the reader device 3 has an antenna area larger than the antenna 2b of the RFID tag 2. The antenna of the reader device 3 has an outer diameter dimension of 40 m×40 mm, for example. The antenna of the reader device 3 has an antenna area of 400 mm$^2$ or more and 40000 mm$^2$ or less, for example.

The auxiliary antenna 4 is an auxiliary antenna configured to expand a communication range of the antenna 2b of the RFID tag 2 to enable communication between the antenna 2b of the RFID tag 2 and the antenna of the reader device 3. In this embodiment, the auxiliary antenna 4 can communicate with the antenna 2b of the RFID tag 2 by converting an electric field signal radiated from the antenna of the reader device 3 into a magnetic field signal. The auxiliary antenna 4 may be a portable type antenna easy to carry around or may be a large antenna placed immediately below a jewel case, for example. Even if the auxiliary antenna 4 is a large antenna, each of resonance loops 42 described later is configured and operates as a magnetic field antenna and is magnetically coupled to the RFID tag 2 in the vicinity of the auxiliary antenna 4 to emit a signal as an electric field antenna. As a result, the communication range of the RFID tag 2 can be increased, enabling the RFID tag 2 to be read by a stationary type reader device located at a longer distance than a conventional RFID reading arrangement.

Figure 4:
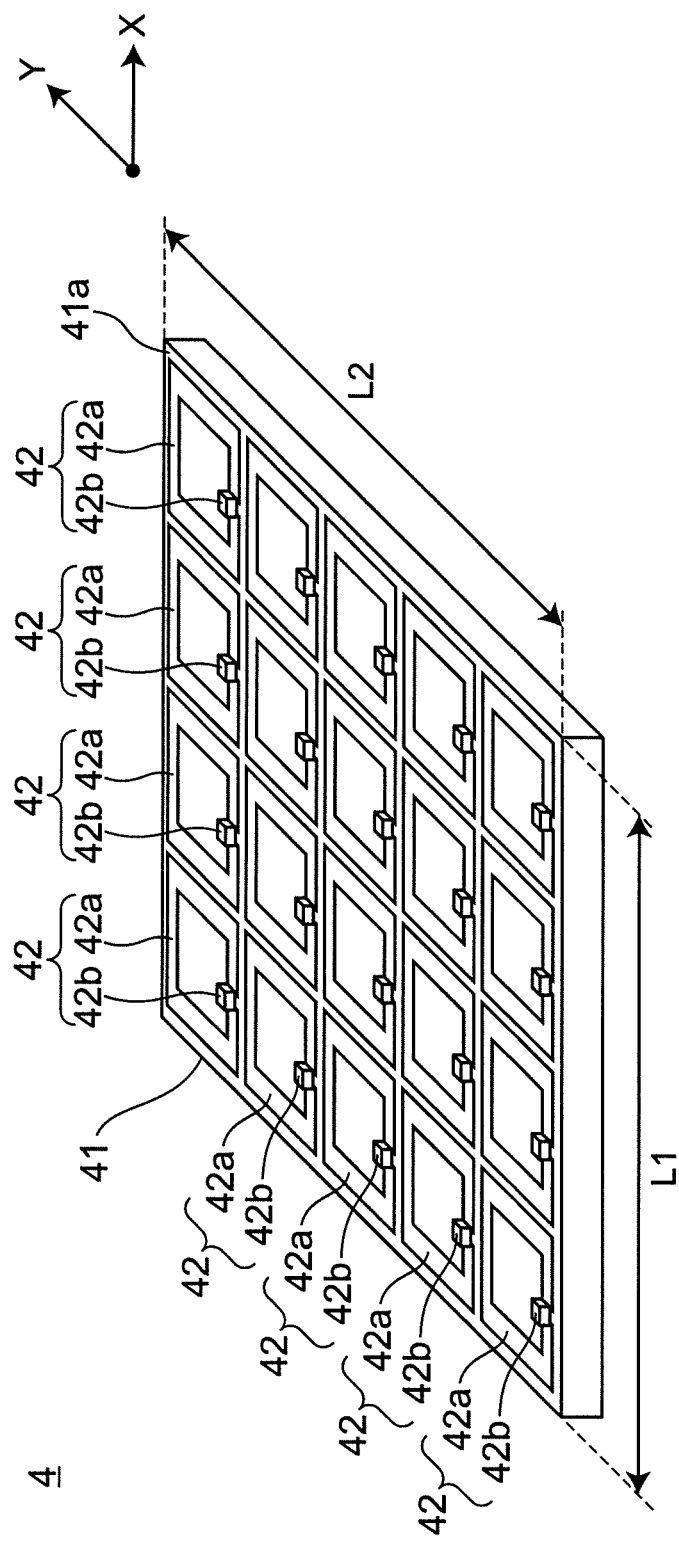
FIG. 4 is a perspective view showing a configuration of an auxiliary antenna according to the embodiment of the present disclosure.

FIG. 4 is a perspective view showing a configuration of the auxiliary antenna 4. As shown in FIG. 4, the auxiliary antenna 4 includes a main body part 41 (referred to as a "main body", for example) and a plurality of the resonance loops 42.

The main body part 41 is formed into a plate shape or a sheet shape. The main body part 41 is made up of, for example, a substrate having rigidity, rubber, a PET film, a polyimide film, or a laminated body thereof. The main body part 41 is configured to include an insulator layer.

The plurality of the resonance loops 42 each operates as a resonant antenna and are configured for magnetic field coupling and electric field coupling to each other as arranged on a first principal surface 41a of the main body part 41. Specifically, the resonance loops 42 serve as a magnetic field antenna as well as an electric field antenna at a frequency near the resonance point (e.g., 860 MHz to 960 MHz). The resonance loops 42 adjacent to each other are disposed at positions enabling magnetic field coupling and electric field coupling to each other. As a result, while the resonant antennas individually operate as a magnetic field antenna, a plurality of resonant antennas achieves magnetic field coupling and electric field coupling so that the auxiliary antenna 4 (i.e., an arranged body of a plurality of resonant antennas) operates as an electric field antenna as a whole (i.e., it is configured to radiate an electric field). Therefore, the auxiliary antenna 4 can communicate with the antenna of the reader device 3 mainly through an electric field or an electromagnetic field and, on the other hand, can communicate with the antenna 2b of the RFID tag 2 mainly through the magnetic field coupling, thereby functioning to substantially expand the communication range of the antenna 2b of the RFID tag 2.

Each of the plurality of the resonance loops 42 is a loop-shaped conductor having the same or substantially the same inner and outer diameter dimensions as each other and arranged at regular intervals from one another. In this embodiment, the plurality of the resonance loops 42 are arranged in a matrix shape on the main body part 41. Specifically, the auxiliary antenna 4 has a structure in which loop-shaped conductors of substantially the same shape are arranged in a lateral direction X and a longitudinal direction Y in planar view. When the auxiliary antenna 4 receives an electric field signal of the reader device 3, an induced current flows through each of the resonant antennas. When the antenna 2b, i.e., the magnetic field antenna of the RFID tag 2, receives the induced current from the resonant antennas, the RFID tag 2 operates to provide data communication. Due to these operating principles, electric lengths L1, L2 in the arrangement directions (i.e., the lateral direction X and the longitudinal direction Y) of the auxiliary antenna 4 are preferably equal to or greater than ¼ wavelength (e.g., 7.5 cm) of a communication frequency, which enables operation as an electric field antenna, or are more preferably an integral multiple of the ¼ wavelength. An outer circumference length (L1×2+L2×2) of the auxiliary antenna 4 is preferably one wavelength or more.

In this embodiment, the antenna of the reader device 3 is an electric field antenna such as a patch antenna. Normally, the reader device 3 having an electric field antenna is for reading a field emission type RFID tag (a long-distance reading tag having a reading distance of 1 m or more) having an electric field antenna such as a patch antenna and a dipole antenna. Therefore, the antenna of the reader device 3 cannot directly read the RFID tag with the magnetic field antenna from a distance. In contrast, using the auxiliary antenna 4 enables the reader device 3 having an electric field antenna to read the magnetic field emission type RFID tag having a magnetic field antenna.

According to the exemplary aspect, each of the resonance loops 42 includes a loop electrode 42b that is a partially opened annular conductor and a capacitor 42b connected to both end portions of the loop electrode 42b. For example, the size of the loop electrode 42b and the capacitance of the capacitor 42b are set such that the resonance loop 42 has a resonance frequency in the UHF band (860 MHz to 960 MHz).

Each of the resonance loops 42 has an antenna area larger than the antenna area of the antenna 2b of the RFID tag 2 and the same as or larger than the antenna area of the antenna of the reader device 3. The resonance loop 42 has an outer diameter dimension of 7 mm×7 mm, for example. The resonance loop 42 has an antenna area of 30 mm$^2$ or more and 900 mm$^2$ or less, for example.

Figure 5B:
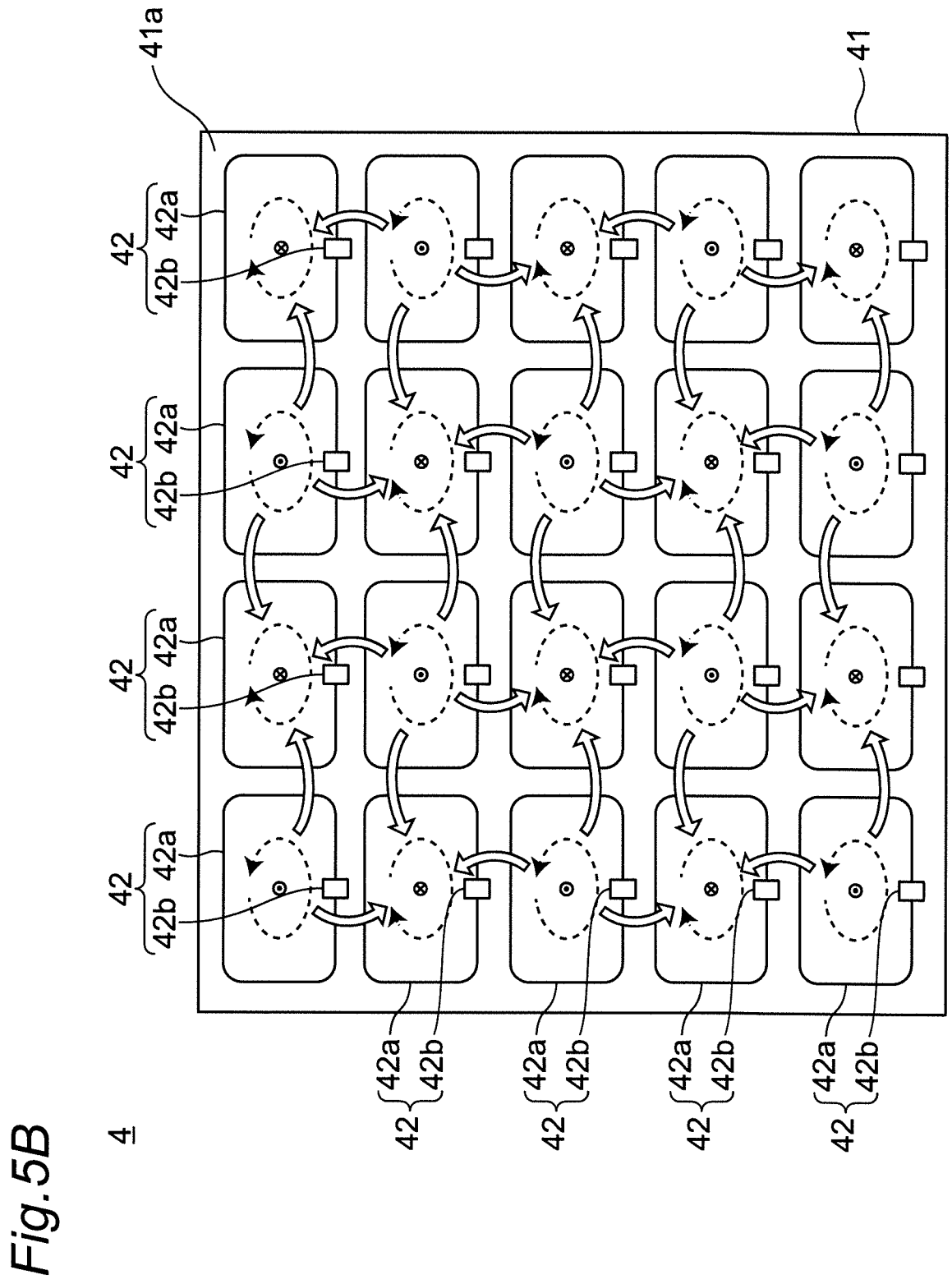
FIG. 5B is a plan view of the auxiliary antenna of FIG. 1.

A method for reading the RFID tag 2 will be described. FIGS. 5A and 5B are plan views of the auxiliary antenna 4. In FIG. 5A, a dashed-dotted line and dashed arrows indicate current flow directions. In FIG. 5B, dashed arrows indicate current flow directions, and white arrows indicate magnetic-field flow directions.

First, the auxiliary antenna 4 shown in FIG. 4 is prepared.

Subsequently, as shown in FIG. 1, the pair of glasses 21 having the RFID tag 2 embedded in the frame 22 is placed on the auxiliary antenna 4.

Subsequently, as shown in FIG. 1, an electric field signal is radiated from the antenna of the reader device 3 to the auxiliary antenna 4. This electric field signal is, for example, a circularly-polarized wave. In the resonance loops 42 forming the auxiliary antenna 4, parallel resonance occurs at a transmission frequency (e.g., 915 MHz) of the reader device 3. Therefore, although the auxiliary antenna 4 has a configuration in which the electrically closed resonance loops 42 are arranged like floating islands, the floating islands have electric fields and magnetic fields radiated therebetween and are coupled to each other. Consequently, when a plurality of the resonance loops 42 receives the electric field signal and a current equal to or greater than ½ wavelength is excited as indicated by the dashed-dotted line of FIG. 5A, electric field resonance occurs in the plurality of the resonance loops 42 as in a dipole antenna. In this case, currents flow through the plurality of the resonance loops 42 as indicated by the dashed arrows of FIG. 5A. At least one of the resonance loops 42 of the auxiliary antenna 4 converts the electric field signal due to the parallel resonance into a magnetic field signal. As a result, as shown by the (thicker) white arrows of FIG. 5B, the adjacent resonance loops 42 are magnetically coupled to each other in a linked manner and the entire auxiliary antenna 4 can communicate with the antenna 2b that is the magnetic field antenna of the RFID tag 2. Consequently, the auxiliary antenna 4 functions to expand the communication range of the antenna 2b of the RFID tag 2, allowing communication between the antenna 2b of the RFID tag 2 and the antenna of the reader device 3, so that the reader device 3 can read the information of the RFID tag 2. In this case, it is not necessary to accurately position the reader device 3 with respect to the RFID tag 2, and the reader device 3 may simply be directed to any position of the auxiliary antenna 4. By using this auxiliary antenna 4, for example, the information of the RFID tag 2 can be read by the reader device 3 even from a position at a distance of 5 m from the RFID tag 2.

According to this embodiment, the plurality of the resonance loops 42 is magnetically coupled to each other to expand the communication range of the antenna of the RFID tag 2 so that communication can be enabled between the small antenna of the RFID tag 2 and the antenna of the reader device 3. Therefore, the necessity of using a small antenna as the antenna of the reader device 3 can be eliminated. Additionally, since the small RFID tag 2 can be read by the distant reader device 3, multiple small products such as jewels, rings, and watches can be tagged and read at the same time.

According to this embodiment, the antenna 2b of the RFID tag 2 is a magnetic field antenna, and the antenna of the reader device 3 is an electric field antenna. With this configuration, a signal wave radiated from the electric field antenna of the reader device 3 is transmitted as an electric field signal to the auxiliary antenna 4, converted into a magnetic field signal by each of the resonance loops 42 of the auxiliary antenna 4, and transmitted to the magnetic field antenna of the RFID tag 2. This enables communication between the reader device 3 and the RFID tag 2 and can eliminate the necessity of using a magnetic field antenna as the reader device 3.

According to this embodiment, the plurality of the resonance loops 42 is arranged such that the electric lengths L1, L2 in the arrangement directions are ¼ wavelength of the communication frequency. This configuration enables the whole of the plurality of the resonance loops 42 to function as an electric field antenna capable of radiating an electric field, so that the magnetic field signal can be converted into the electric field signal. As a result, the communication range of the antenna of the RFID tag 2 can be expanded to enable communication between the small magnetic field antenna of the RFID tag 2 and the electric field antenna of the reader device 3.

As described above, the plurality of the resonance loops 42 preferably has the same or substantially the same inner and outer diameter dimensions and is arranged at regular intervals. This configuration includes the plurality of the resonance loops 42 having the same configuration and therefore can eliminate the necessity of positioning the auxiliary antenna 4 at a specific position with respect to the RFID tag 2 or the reader device 3.

It is noted that even if the resonance frequencies of the resonance loops 42 are set to the same frequency, variations may occur in the actual resonance frequencies of the plurality of the resonance loops 42. This is believed to be due to the adjacent resonance loops 42 capacitively coupling to each other and thereby lowering the resonance frequency. Specifically, the resonance frequency of the resonance loops 42 changes depending on the number of the adjacent resonance loops. Therefore, the resonance loops 42 arranged on the center side of the main body part 41 preferably have a resonance frequency set higher than the resonance loops 42 arranged on the end portion side of the main body part 41. As a result, the variations can be suppressed in the actual resonance frequency of the plurality of the resonance loops 42. The resonance frequency of the resonance loop 42 can be adjusted by, for example, changing the size of the loop electrode 42b and the capacitance of the capacitor 42b.

Figure 6:
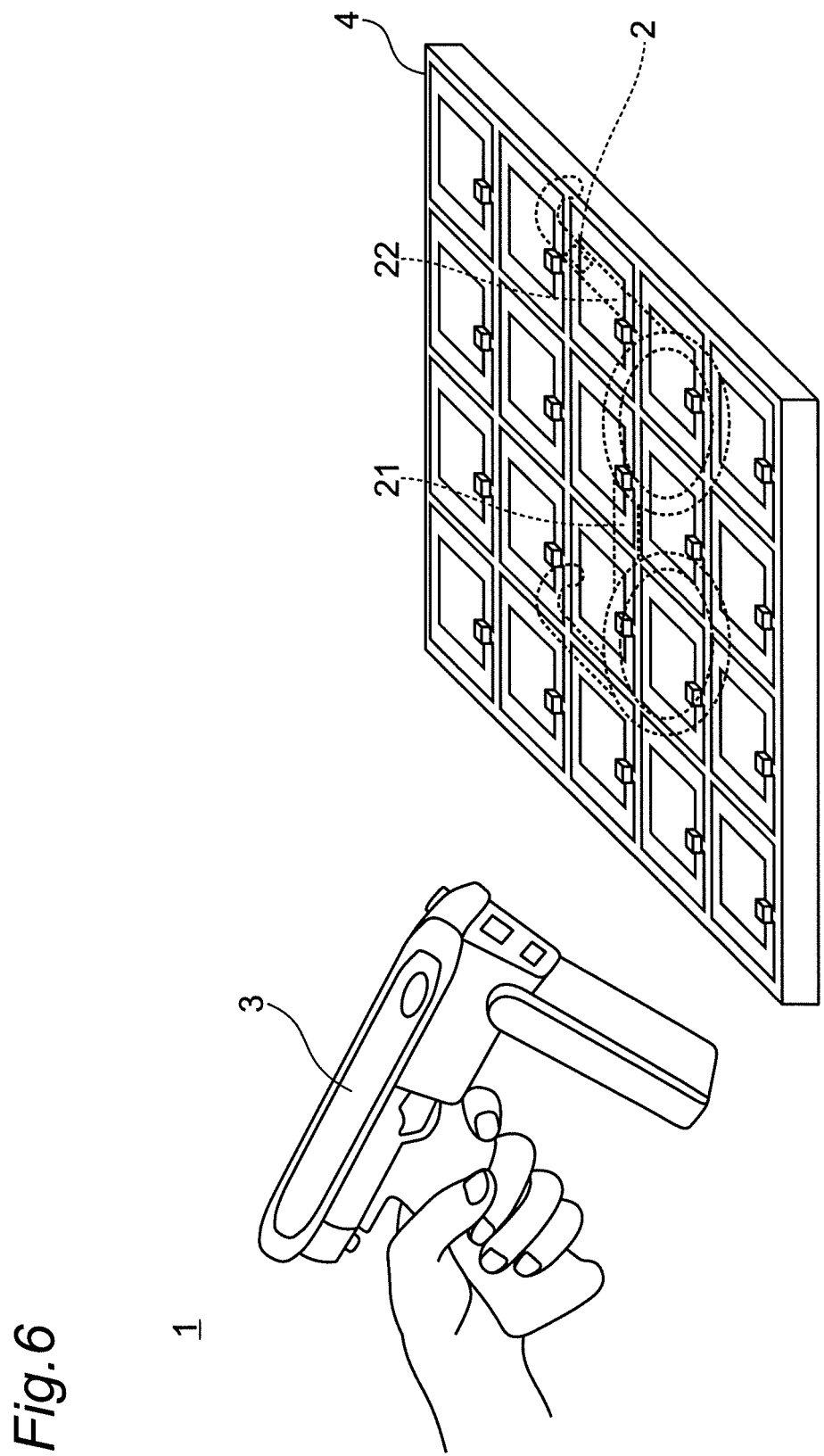
FIG. 6 is a perspective view showing a modification in which the auxiliary antenna is disposed between a reader device and an article in the RFID system of FIG. 1.

It is further noted that the present disclosure is not limited to the exemplary embodiment described above and can be implemented in various other forms. For example, in the above description, the pair of glasses 21 having the RFID tag 2 embedded in the frame 22 is placed on the auxiliary antenna 4; however, the present disclosure is not limited thereto. For example, as shown in FIG. 6, the auxiliary antenna 4 may be disposed between the reader device 3 and the eyeglasses 21. Even in this arrangement, the auxiliary antenna 4 functions to expand the communication range of the antenna 2b of the RFID tag 2, allowing communication between the antenna 2b of the RFID tag 2 and the antenna of the reader device 3, so that the reader device 3 can read the information of the RFID tag 2.

Figure 7:
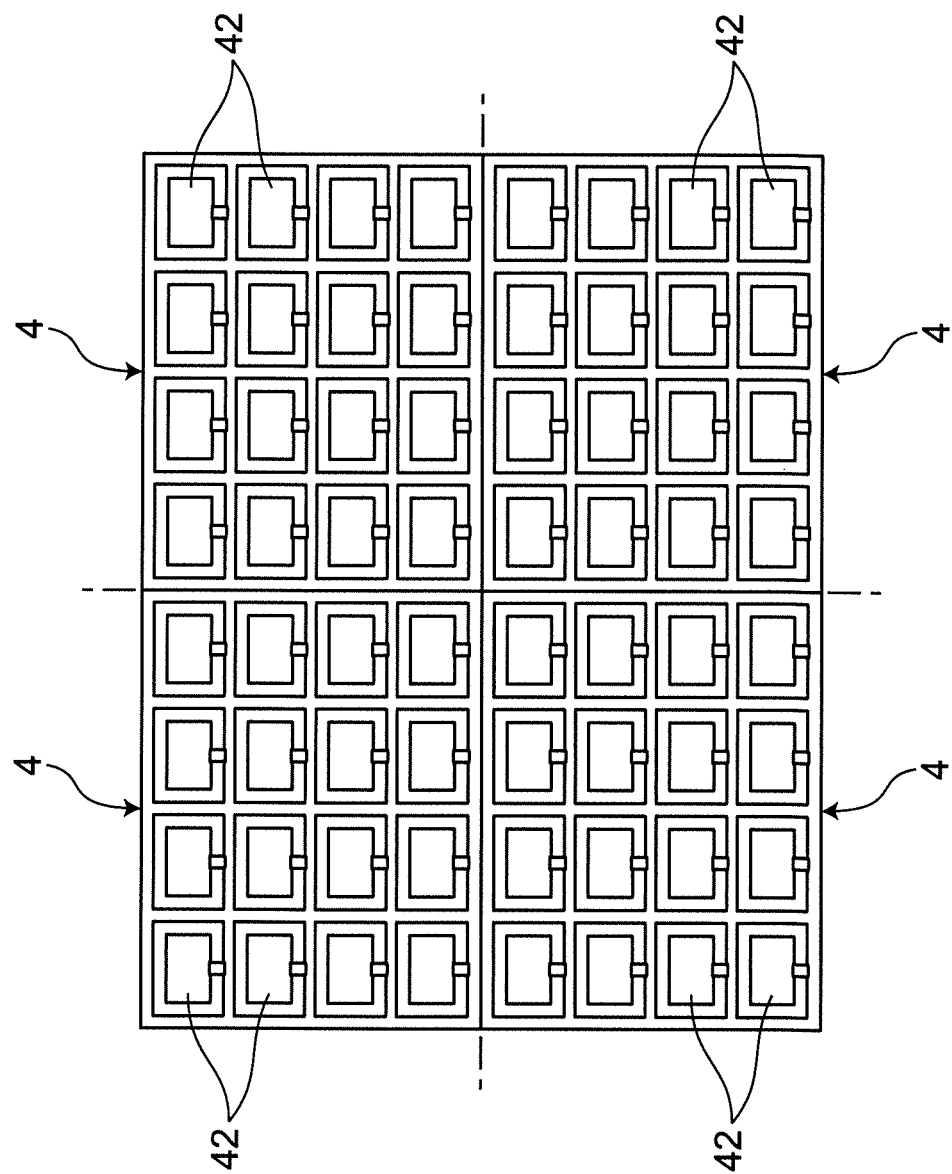
FIG. 7 is a plan view showing a state in which a plurality of the auxiliary antennas of FIG. 4 is coupled.

In the above description, the one auxiliary antenna 4 is used; however, the present disclosure is not limited thereto. For example, as shown in FIG. 7, a plurality of (e.g., four) auxiliary antennas 4 may be coupled to each other and used. It should be appreciated that even if an article with the RFID tag 2 is sufficiently larger than the one auxiliary antenna 4, an arbitrary number of the auxiliary antennas 4 can be coupled and used depending on the size of the article to reliably expand the communication range of the antenna 2b of the RFID tag 2.

In the above description, the RFID tag 2 attached to one article is read by the one reader device 3; however, the present disclosure is not limited thereto. For example, the one reader device 3 having an electric field antenna may collectively read the RFID tags 2 having magnetic field antennas respectively attached to a plurality of widely arranged articles.

Figure 8:
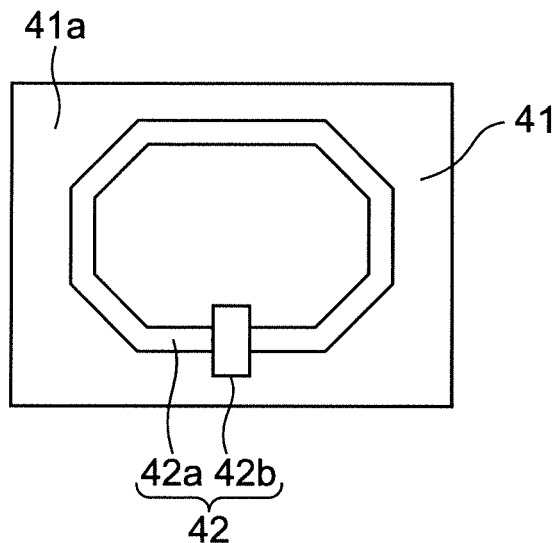
FIG. 8 is a plan view showing a modification of a resonance loop of the auxiliary antenna of FIG. 4.

In FIGS. 1 to 7, the shape of the loop electrode 42b of each of the resonance loops 42 is shown as a rectangular or substantially rectangular shape. However, it should be appreciated that the present disclosure is not limited thereto. For example, as shown in FIG. 8, the loop electrode 42b may have an octagonal shape or other polygonal shapes.

Figure 9A:
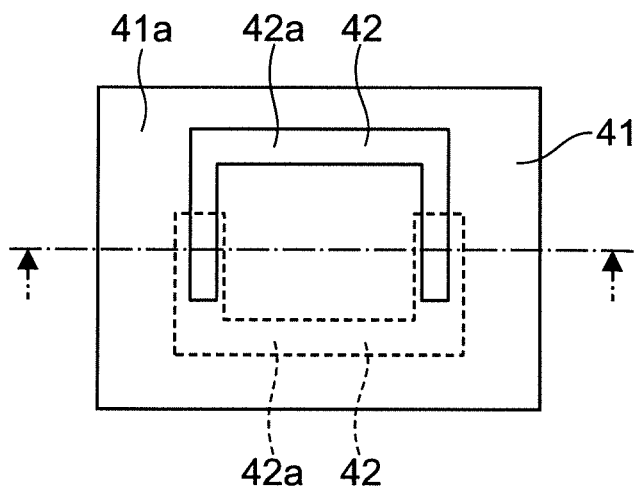
FIG. 9A is a plan view showing a modification of the resonance loop of the auxiliary antenna of FIG. 4.
Figure 9B:
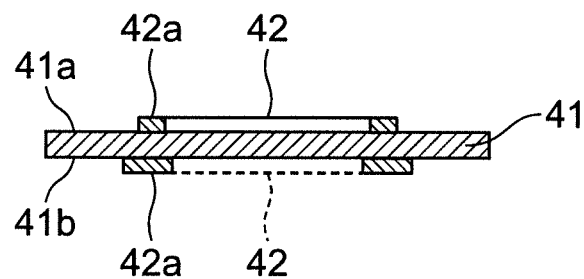
FIG. 9B is a cross-sectional view taken along a line A-A of FIG. 9A.

In the above description, the resonance loops 42 are formed only on the first principal surface 41a of the main body part 41; however, the present disclosure is not limited thereto. For example, as shown in FIGS. 9A and 9B, the resonance loops 42 may be arranged on the first principal surface 41a of the main body part 41 and a second principal surface 41b opposite to the first principal surface 41a. In this case, as shown in FIG. 9A, when viewed through the main body part 41 in a direction orthogonal to the first principal surface 41a (or the second principal surface 41b), a closed loop may be formed by the U-shaped loop electrode 42b on the first principal surface 41a side and the U-shaped loop electrode 42b on the second principal surface 41b side. With this configuration, a capacitor can be formed by a parasitic capacitance formed between the loop electrode 42b on the first principal surface 41a side and the loop electrode 42b on the second principal surface 41b side, so that the necessity of separately mounting a capacitor on the main body part 41 can be eliminated. As a result, the auxiliary antenna 4 can be reduced in thickness and can also be reduced in cost. Additionally, the durability of the auxiliary antenna 4 can be improved.

In this case, one of the loop electrode 42b on the first principal surface 41a side and the loop electrode 42b on the second principal surface 41b side preferably has a larger conductor width than the other. This can reduce a burden of positioning the loop electrode 42b on the first principal surface 41a side and the loop electrode 42b on the second principal surface 41b side in an overlapping manner when viewed in a direction orthogonal to the first principal surface 41a (or the second principal surface 41b).

Figure 10:
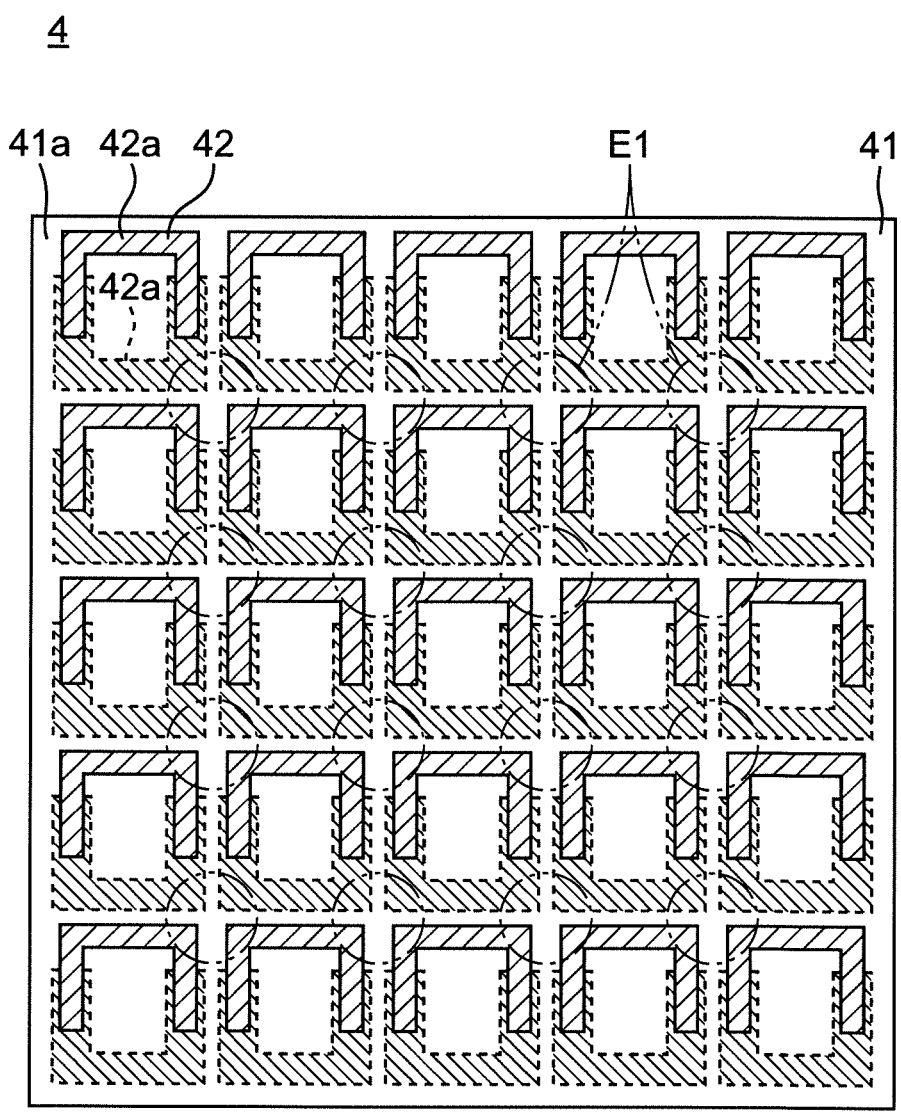
FIG. 10 is a plan view showing a modification of the auxiliary antenna of FIG. 4.
Figure 11:
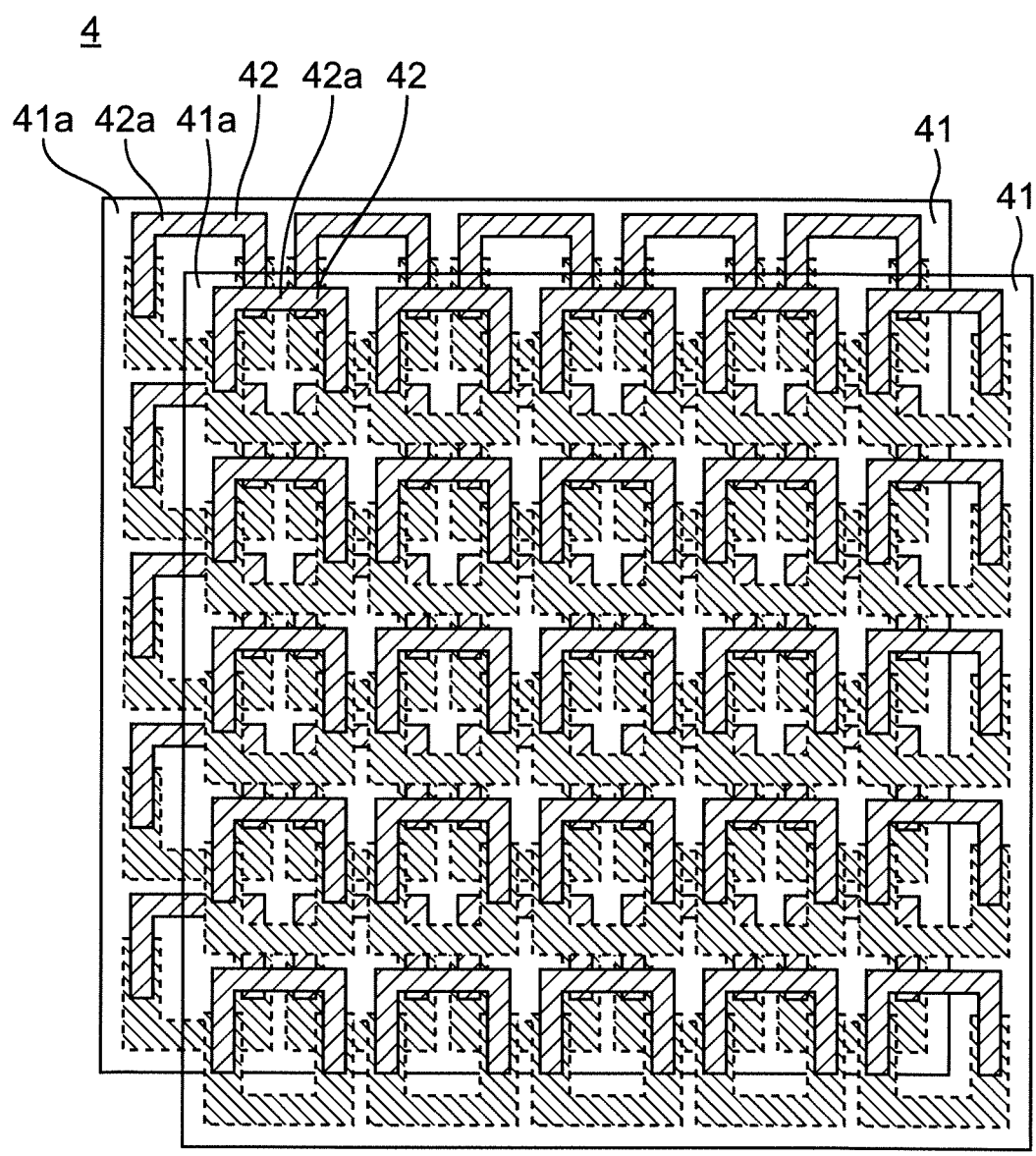
FIG. 11 is a plan view showing a modification of the auxiliary antenna of FIG. 4.

If the resonance loops 42 are arranged in a matrix shape as shown in FIG. 10 according to an exemplary aspect, a null point may be generated in a center region E1 of the four resonance loops 42 adjacent to each other. Therefore, as shown in FIG. 11, the auxiliary antenna 4 may be configured to have two main body parts 41 on which the plurality of the resonance loops 42 is arranged to form closed loops. More specifically, when viewed through in a direction orthogonal to the first principal surface 41a (or the second principal surface 41b), the auxiliary antenna 4 may be configured such that a plurality of the resonance loops 42 arranged on one of the main body parts 41 is shifted in a plane direction from a plurality of the resonance loops 42 arranged on the other main body part 41. With this configuration, the resonance loops 42 of the one main body parts 41 function to suppress generation of a null point in the central region E1 of the four resonance loops 42 of the other main body part 41. This enables the reader device 3 to more reliably read the information of the RFID tag 2.

Figure 12:
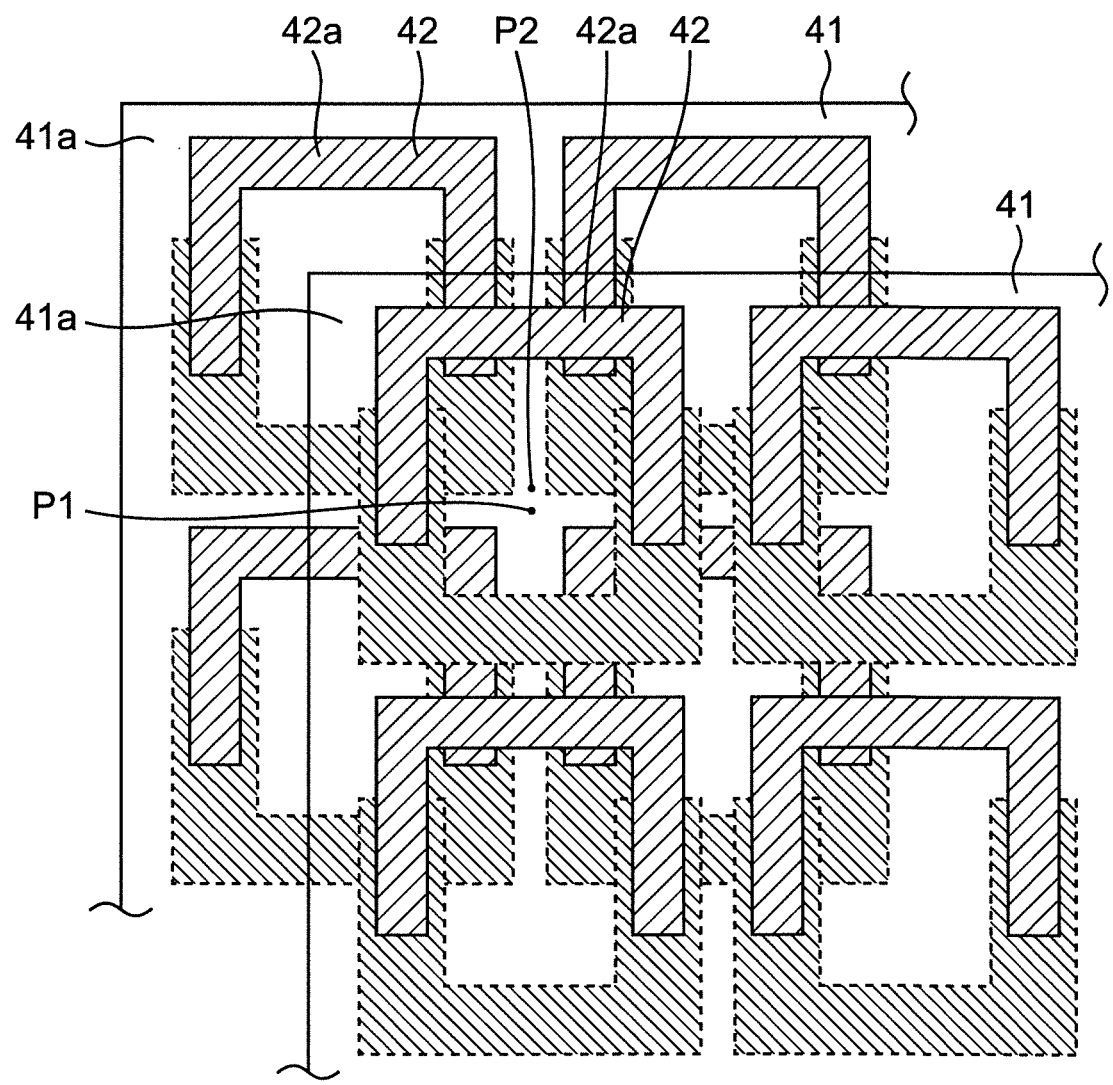
FIG. 12 is a partially enlarged view of FIG. 11.

In this case, as shown in FIG. 12, a center point P1 of the four resonance loops 42 adjacent to each other on the other main body part 41 is preferably located inside the resonance loop 42 of the one main body part 41. This can reliably prevent the generation of the null point in the center region E1 of the four resonance loops 42 of the other main body part 41.

As shown in FIG. 12, the center point P1 of the four resonance loops 42 adjacent to each other on the other main body part 41 is shifted in a plane direction from a center point P2 of the resonance loops 42 of the one main body part 41. This allows the magnetic fields generated from the four resonance loops 42 of the other main body part 41 to cancel each other at the center point P2 of the resonance loop 42 of the one main body part 41 so that generation of a new null point can be suppressed.

In the auxiliary antenna 4, pluralities of the resonance loops 42 (e.g., the resonance loops with capacitors shown in FIG. 4) may be formed and shifted in a plane direction on the first principal surface and the second principal surface of the one main body part 41. Even with such a configuration, the resonance loops 42 on the first principal surface function to suppress generation of a null point in the central region of the four resonance loops 42 on the second principal surface, and the reader device 3 can more reliably read the information of the RFID tag 2.

Figure 13:
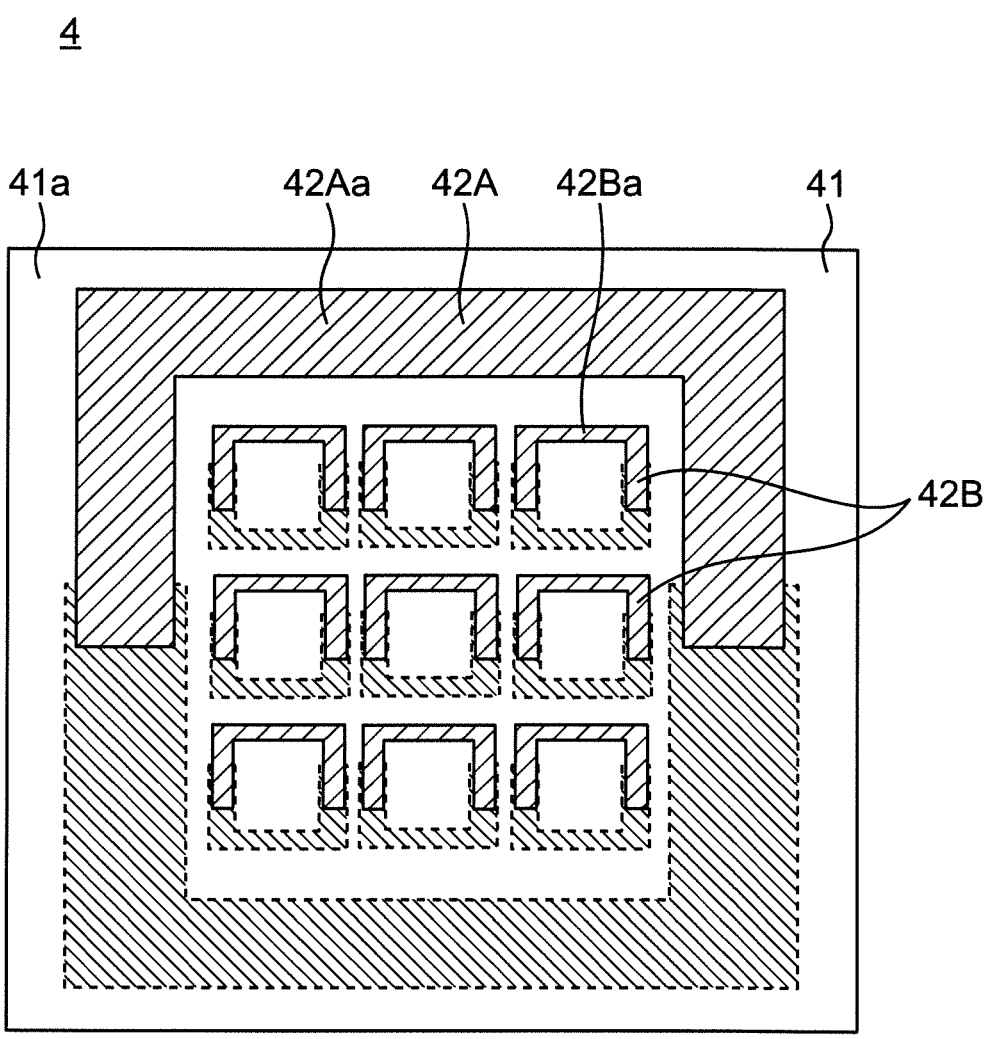
FIG. 13 is a plan view showing a modification of the auxiliary antenna of FIG. 4.
Figure 14:
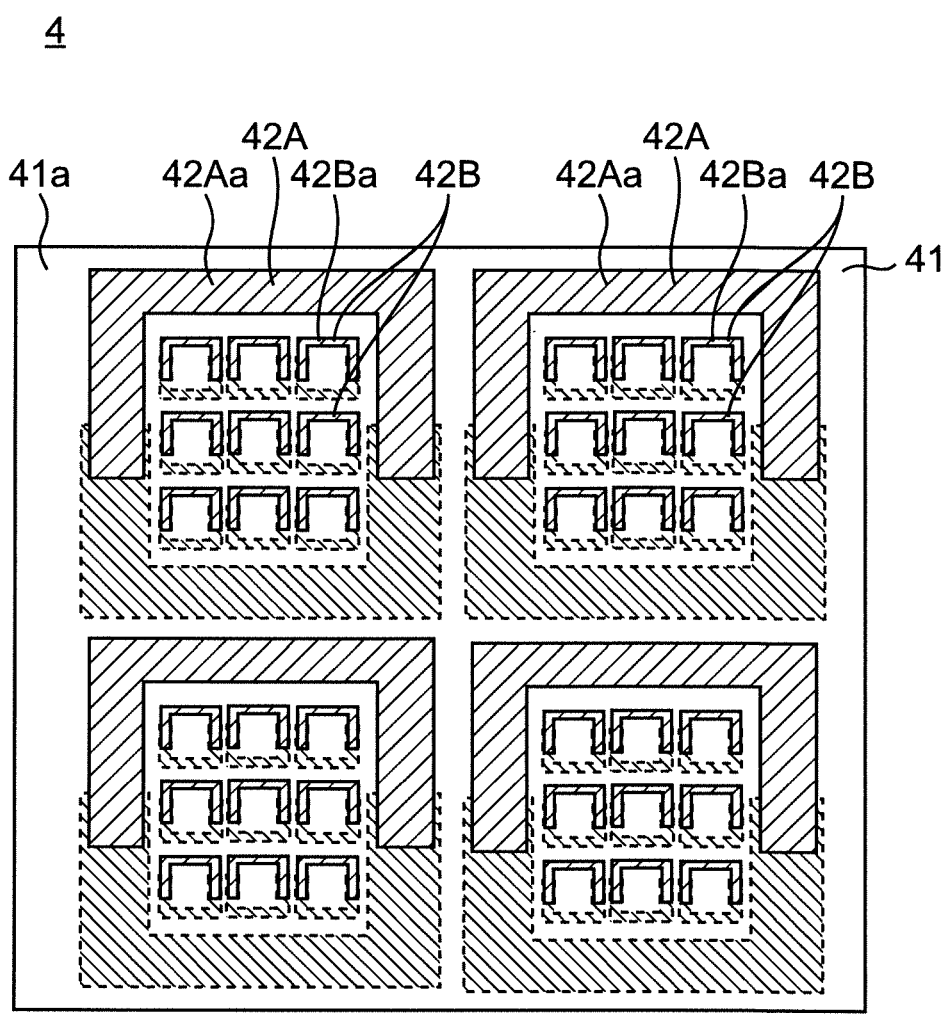
FIG. 14 is a plan view showing a modification of the auxiliary antenna of FIG. 4.
Figure 15:
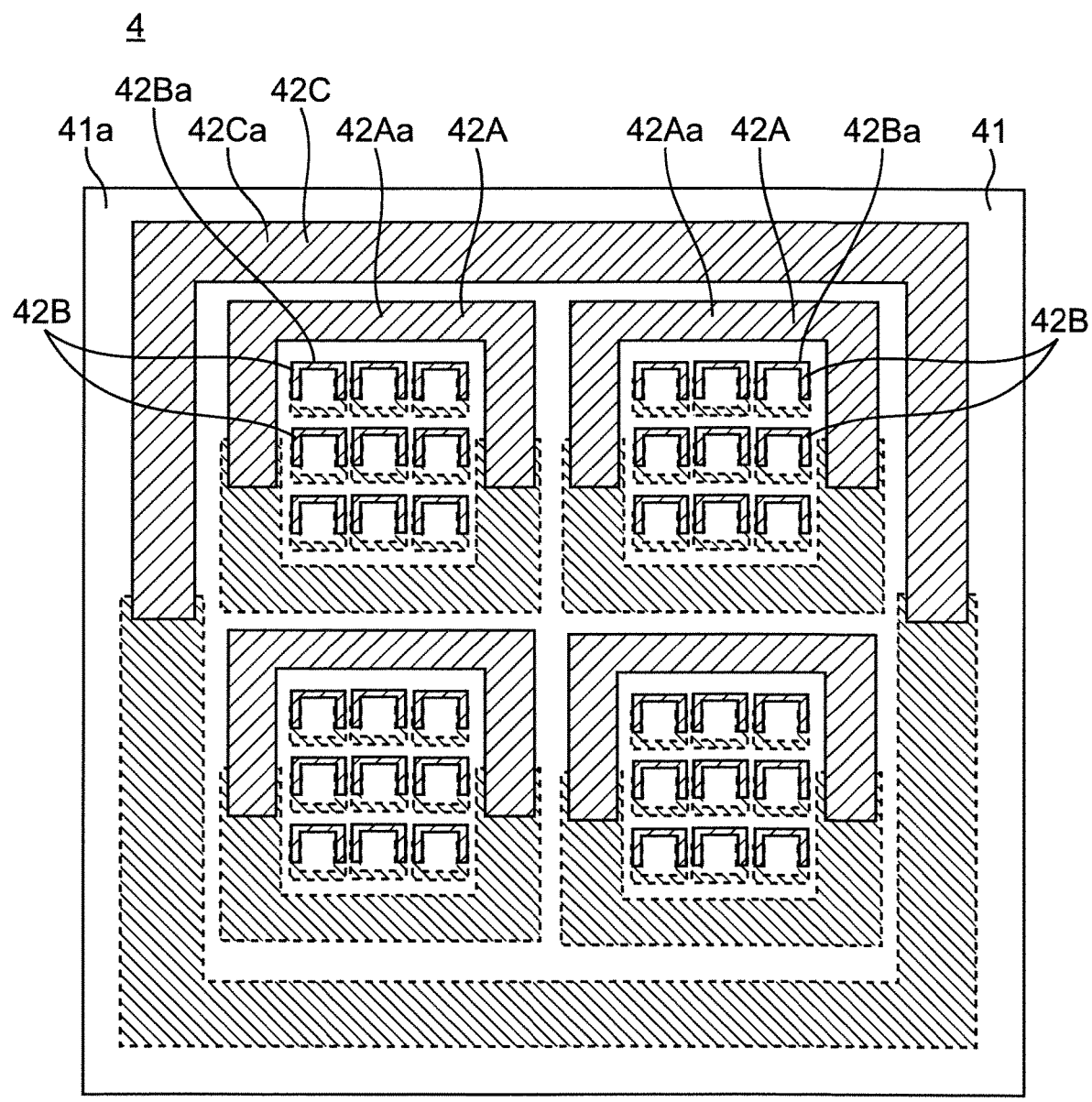
FIG. 15 is a plan view showing a modification of the auxiliary antenna of FIG. 4.
Figure 16:
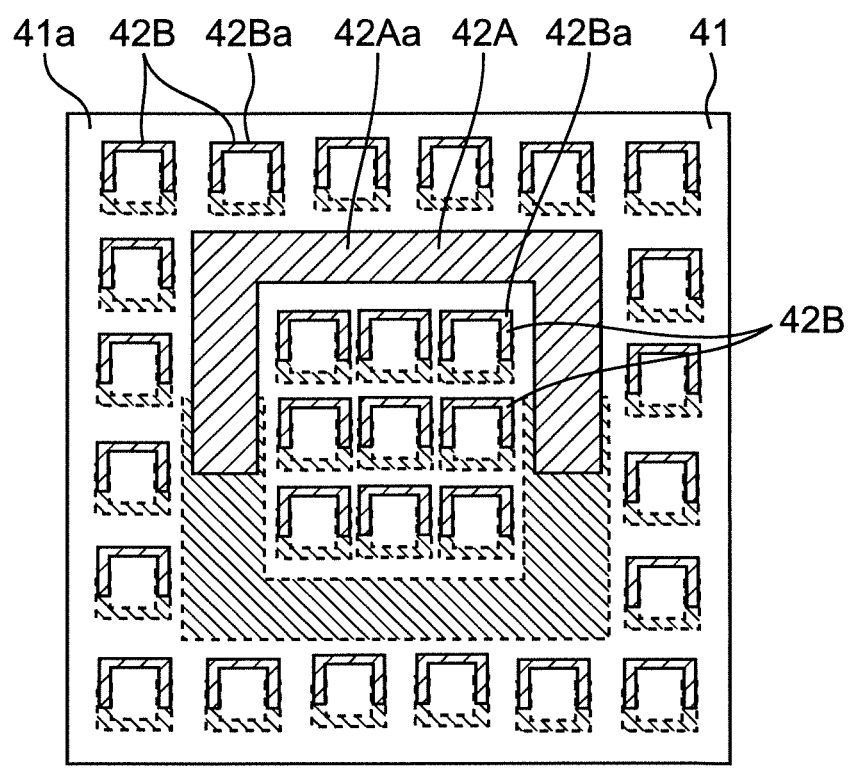
FIG. 16 is a plan view showing a modification of the auxiliary antenna of FIG. 4.
Figure 17:
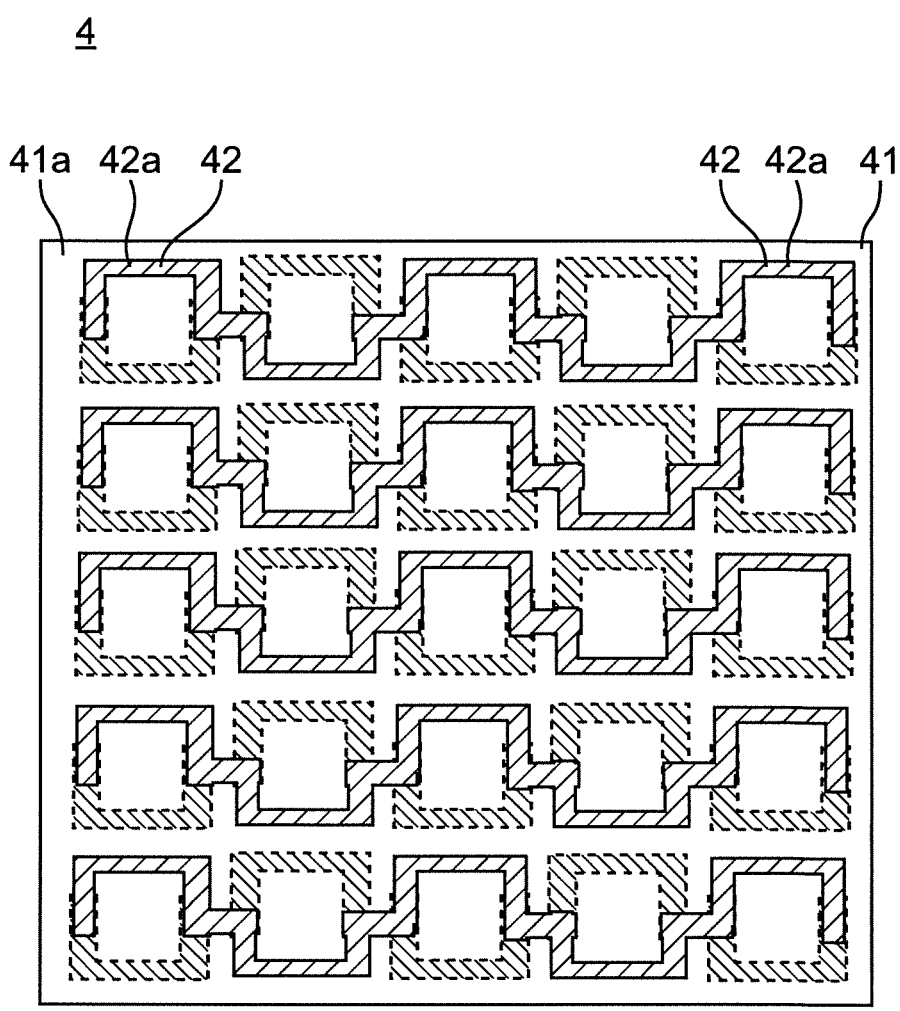
FIG. 17 is a plan view showing a modification of the auxiliary antenna of FIG. 4.

In the above description, the resonance loops 42 have the same or substantially the same inner and outer diameter dimensions; however, the present disclosure is not limited thereto. For example, as shown in FIG. 13, a plurality of small-diameter resonance loops 42B may be disposed inside a large-diameter resonance loop 42A. As shown in FIG. 14, pluralities of the small-diameter resonance loops 42B may be disposed inside a plurality of the large-diameter resonance loops 42A. As shown in FIG. 15, pluralities of the small-diameter resonance loops 42B may be disposed inside a plurality of the large-diameter resonance loops 42A, and a resonance loop 42C having a larger diameter may further be disposed outside the plurality of the large-diameter resonance loops 42A. A plurality of the small-diameter resonance loops 42B may be disposed inside and outside the large-diameter resonance loop 42A. As shown in FIG. 16, a plurality of the small-diameter resonance loops 42B may be disposed inside and outside the large-diameter resonance loop 42A. With these configurations, even when the electric field signal (radio wave or electromagnetic wave) cannot sufficiently be received from the electric field antenna of the reader device 3 by only the small-diameter resonance loops 42B, the large-diameter resonance loops 42A, 42C can sufficiently receive electric field signal from the electric field antenna of the reader device 3. As a result, electric power can be transmitted from the electric field antenna of the reader device 3 through the large-diameter resonance loops 42A, 42C and the small-diameter resonance loops 42b to the magnetic field antenna of the RFID tag 2.

The large-diameter resonance loops 42A, 42C and the small-diameter resonance loops 42b have the size of the loop electrode and the capacitance (parasitic capacitance) of the capacitor set such that the resonance loops have the same or substantially the same resonance frequency (860 MHz to 960 MHz). Loop electrodes 42Aa, 42Ca of the large-diameter resonance loops 42A, 42C are preferably formed to have a conductor width larger than a loop electrode 42Ba of the small-diameter resonance loop 42B so as to reduce the L component. To reduce the C component, when viewed in a direction orthogonal to the first principal surface 41a, an amount of overlap is preferably made smaller between the loop electrodes 42Aa, 42Ca of the large-diameter resonance loops 42A, 42C on the first principal surface 41a side and the loop electrodes 42Aa of the large-diameter resonance loops 42A on the second principal surface 41b side.

In the above description, the resonance loops 42 are disposed with a gap formed therebetween. However, it should be appreciated that the present disclosure is not limited thereto, and portions of the resonance loops 42 may be coupled to each other. For example, the loop electrodes 42b on the first principal surface 41a side may be coupled into a meander shape to have ½ wavelength or more. With this configuration, the coupled loop electrodes 42b more easily receive the electric field signal of the reader device 3 so that a flow of a current can be facilitated in the coupled loop electrodes 42b.

Figure 18:
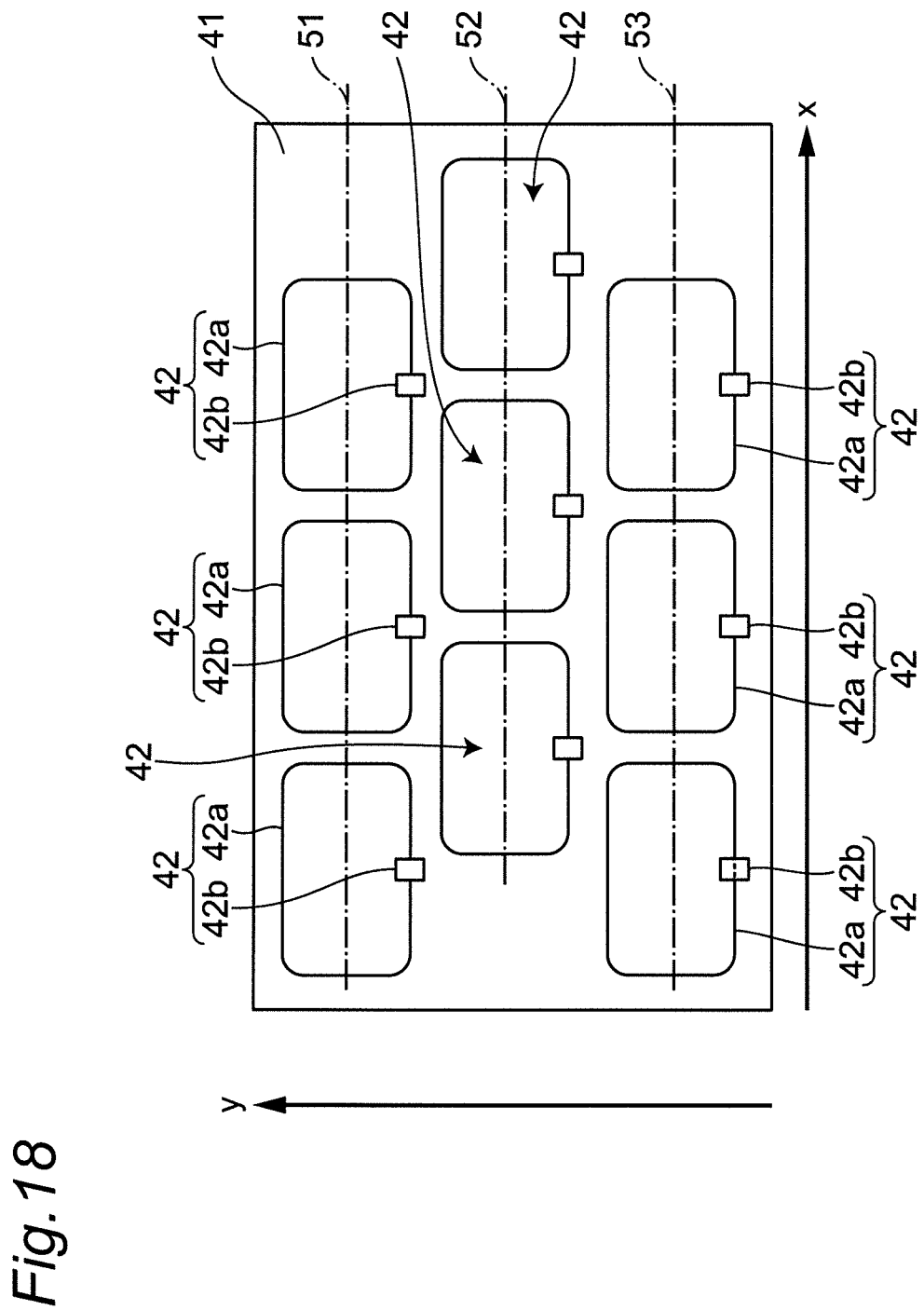
FIG. 18 is a plan view showing a modification of the auxiliary antenna of FIG. 4.

In the above description, the plurality of the resonance loops 42 is arranged in a matrix shape on the first principal surface 41a of the main body part 41; however, the present disclosure is not limited thereto. For example, as shown in FIG. 18, a plurality of the resonance loops 42 may be arranged in a first row 51, a second row 52, and a third row 53 along a first direction x. The resonance loops 42 arranged in the second row 52 may be arranged in an offset manner in the first direction x so as not to align with the resonance loops 42 arranged in the first row 51 and the third row 53 in a second direction y orthogonal to the first direction x. With this configuration, the magnetic field generated from the auxiliary antenna 4 can be made larger, and the communication range of the antenna 2b of the RFID tag 2 can further be expanded. This enables the reader device 3 to more reliably read the information of the RFID tag 2. If the resonance loops 42 arranged in the rows are arranged in a matrix shape without offset as shown in FIG. 5, a null point may be generated in a middle portion (center region) of the four resonance loops 42A as described above. In this case, depending on the size of the RFID tag 2 (especially when the RFIC tag 2 is small), the information of the RFID tag 2 may be unreadable. In this regard, by arranging the resonance loops 42 arranged in any of the rows in an offset manner as shown in FIG. 18, the null point can be made smaller. This enables the reader device 3 to more reliably read the information of the RFID tag 2.

In the above description, the plurality of the resonance loops 42 is arranged in the first row 51, the second row 52, and the third row 53; however, the present disclosure is not limited thereto. For example, the plurality of the resonance loops 42 may be arranged only in the first row 51 and the second row 52. Alternatively, the plurality of the resonance loops 42 may be arranged in one row or four or more rows along the first direction x as should be appreciated to one skilled in the art.

In the above description, the plurality of the resonance loops 42 is exposed to the outside; however, the present disclosure is not limited thereto. A protective layer may be disposed to cover the plurality of the resonance loops 42.

In the above description, the reader device 3 has a reader function of reading the information of the RFID tag 2; however, the present disclosure is not limited thereto. For example, the reader device 3 may be configured to have a reader/writer function of reading the information of the RFID tag 2 and writing information to the RFID tag 2.

Figure 19:
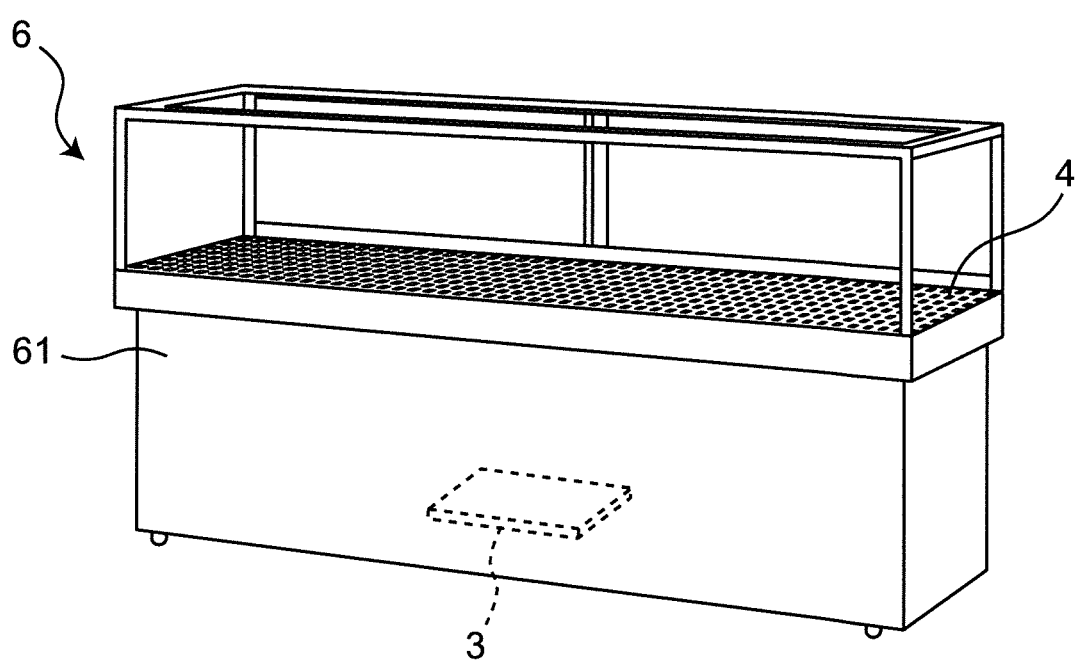
FIG. 19 is a perspective view showing an example in which the auxiliary antenna according to the embodiment of the present disclosure is attached to a display stand of a product display case.

As shown in FIG. 19, the auxiliary antenna 4 according to the embodiment may be attached to a display stand 61 of a product display case 6. In this case, for example, the reader device 3 may be disposed inside the display stand 61 such that the electric field signal is radiated from the electric field antenna of the reader device 3 toward the auxiliary antenna 4. The auxiliary antenna 4 can communicate with the antenna of the reader device 3 mainly through an electric field or an electromagnetic field and, on the other hand, can communicate with an antenna 2Ab of an RFID tag 2A described later mainly through magnetic field coupling. As a result, regardless of where the RFID tag 2A is placed on the auxiliary antenna 4, the reader device 3 can read information on the RFID tag 2A.

Figure 20:
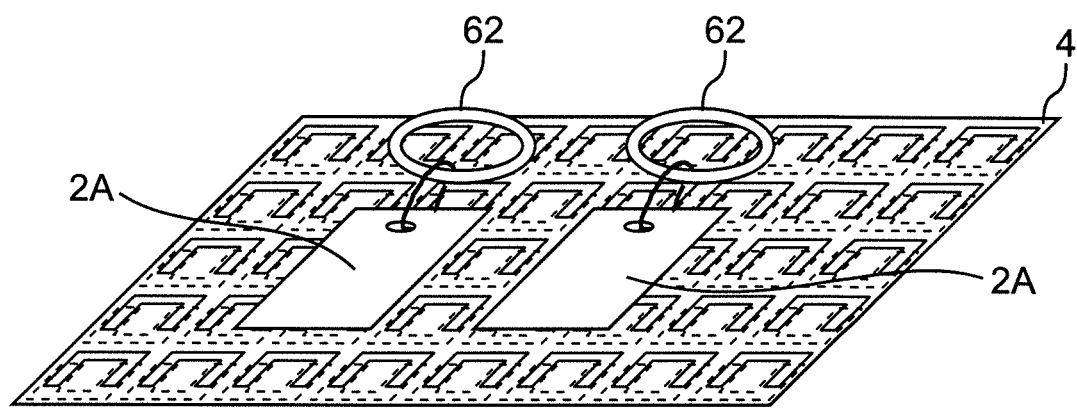
FIG. 20 is a perspective view showing an example in which jewelry articles with RFID tags are disposed on the auxiliary antenna of FIG. 19.
Figure 21:
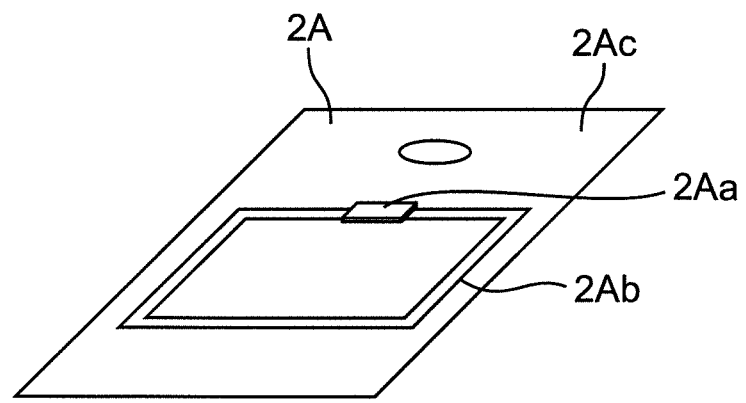
FIG. 21 is a perspective view showing a configuration example of an RFID tag.

FIG. 20 is a perspective view showing an example in which jewelry articles (rings) 62 shown as exemplary articles with the RFID tags 2A are disposed on the auxiliary antenna 4. FIG. 21 is a perspective view showing a configuration example of the RFID tag 2A. As shown in FIG. 21, each of the RFID tags 2A attached to the jewelry articles 62 includes an RFIC chip 2Aa and an antenna 2Ab. The RFIC chip 2Aa is an element having a circuit, or the like, in which identification information of the article is stored. The RFIC chip 2Aa is mounted on a substrate 2Ac and is electrically connected to the antenna 2Ab. The antenna 2Ab is a loop type magnetic field antenna.

The auxiliary antenna 4 and the antenna 2Ab of the RFID tag 2A can communicate through a magnetic field at a distance of 3 cm, for example. Therefore, if the antenna 2Ab of the RFID tag 2A is separated by 3 cm or more from the auxiliary antenna 4, the reader device 3 cannot read the information of the RFID tag 2A. Whether a customer has picked up the jewelry article (ring) 62 with the RFID tag 2A can be presumed based on whether the information of the RFID tag 2A can be read.

Figure 22:
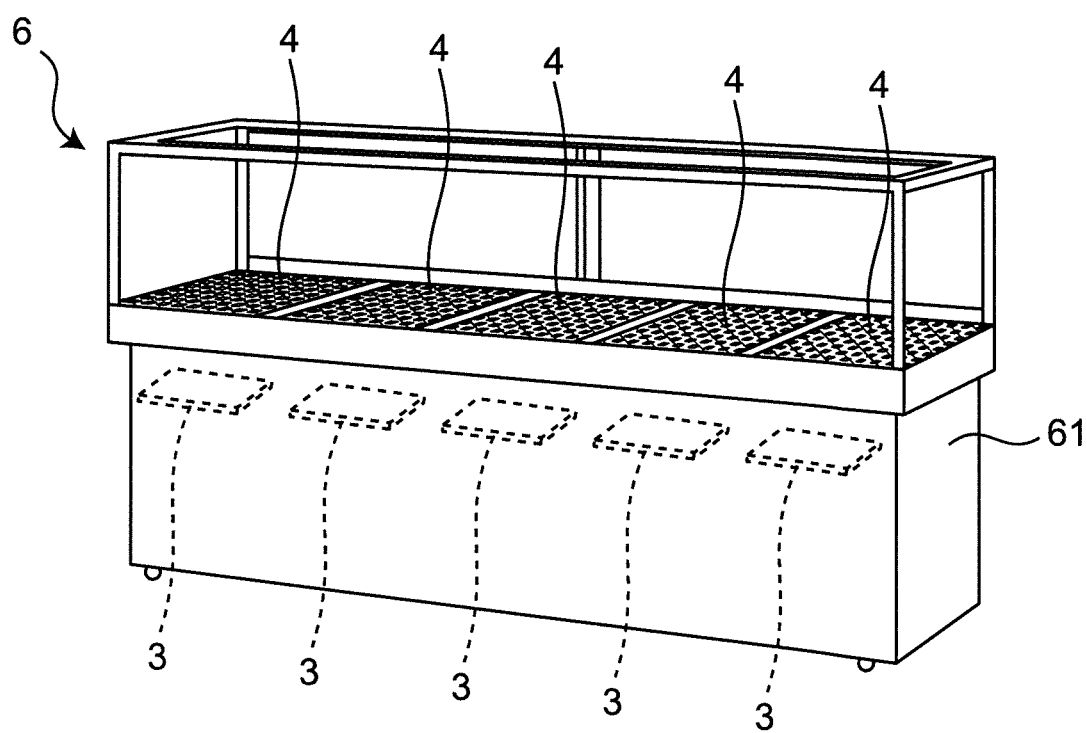
FIG. 22 is a perspective view showing an example in which a plurality of the auxiliary antennas according to the embodiment of the present disclosure is separately attached to a display stand of a product display case.

As shown in FIG. 22, a plurality of the auxiliary antennas 4 according to the exemplary embodiment may separately be attached to the display stand 61 of the product display case 6. In this case, for example, a plurality of the reader devices 3 corresponding to the plurality of the auxiliary antennas 4 may be disposed inside the display stand 61 such that the electric field signals are radiated from the electric field antennas of the plurality of the reader devices 3 toward the plurality of the auxiliary antennas 4. With this configuration, by identifying the reader device 3 reading the RFID tag 2A, on which auxiliary antenna 4 the RFID tag 2A is disposed can be identified. The auxiliary antennas 4 are preferably separated by a gap at a distance (e.g., the width of the one resonance loop 42) preventing the magnetic field coupling between the resonance loops 42 of the auxiliary antennas 4 adjacent to each other.

Figure 23:
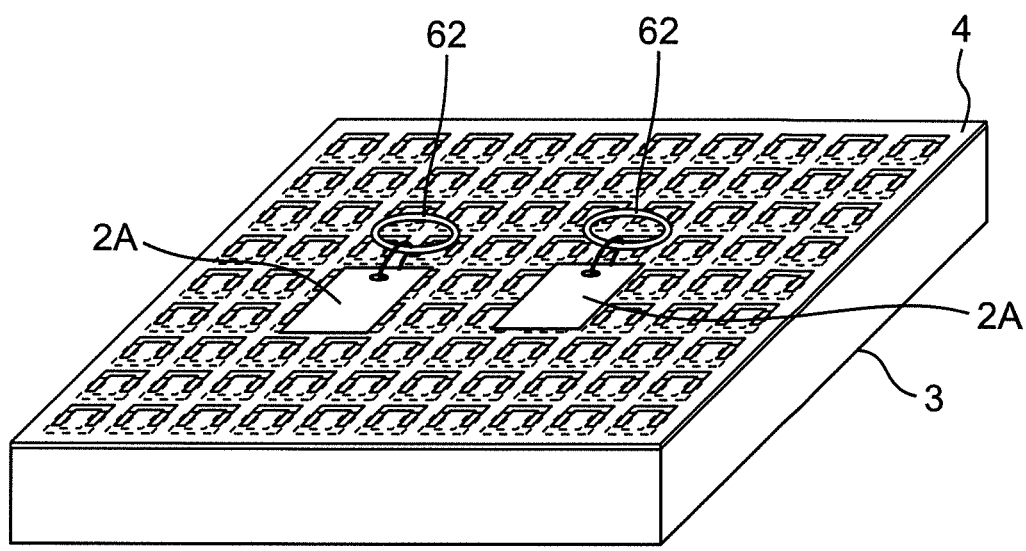
FIG. 23 is a perspective view showing an example in which the auxiliary antenna according to the embodiment of the present disclosure is directly attached to a stationary type reader device.

As shown in FIG. 23, the auxiliary antenna 4 according to the embodiment may directly be attached to the stationary type reader device 3 including an electric field antenna (e.g., a patch antenna). Even in this case, the reader device 3 can read the information of the RFID tags 2A attached to the jewelry articles 62 through the auxiliary antenna 4.

Figure 24:
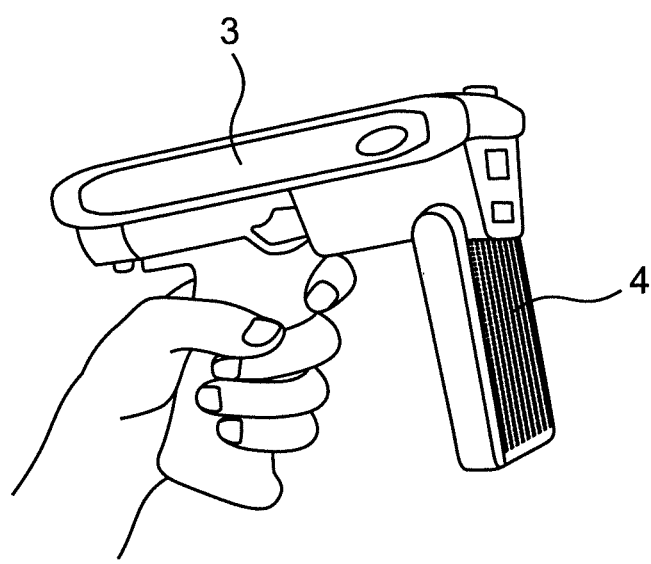
FIG. 24 is a perspective view showing an example in which the auxiliary antenna according to the embodiment of the present disclosure is directly attached to a handheld type reader device.
Figure 25:
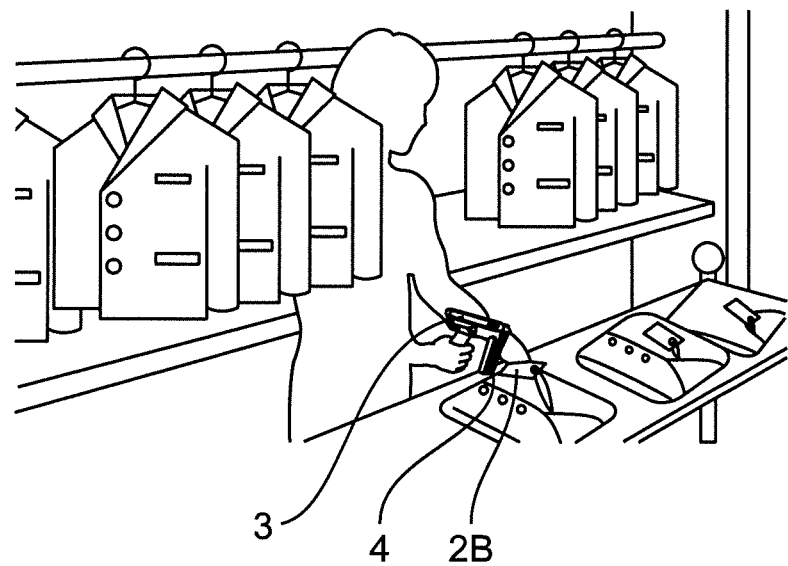
FIG. 25 is a perspective view showing a reading of the RFID tag by the reader device of FIG. 24.

As shown in FIGS. 24 and 25, the auxiliary antenna 4 according to the embodiment may directly be attached to the handheld type reader device 3 including an electric field antenna (e.g., a patch antenna). Even in this case, the reader device 3 can read information of an RFID tag 2B attached to an article such as clothes through the auxiliary antenna 4.

It should be appreciated that variations in the exemplary embodiments can appropriately be combined to produce the respective effects thereof.

Moreover, although the present disclosure has been sufficiently described in terms of preferable embodiments with reference to the accompanying drawings, various modifications and corrections are apparent to those skilled in the art. It should be understood that such modifications and corrections are included in the present disclosure without departing from the scope of the present disclosure according to the accompanying claims.

The auxiliary antenna according to the present disclosure enables communication between the small antenna of the RFID tag and the antenna of the reader device without using a small antenna as the antenna of the reader device and is therefore useful for an RFID system.

EXPLANATIONS OF LETTERS OR NUMERALS

1 RFID system
2, 2A, 2B RFID tag
2b, 2Aa RFIC chip
2b, 2Ab antenna (magnetic field antenna)
2c, 2Ac substrate
2d sealing resin
3 reader device
4 auxiliary antenna
5 product display case
6 pair of glasses
21 frame
22 main body part
41a first principal surface
41b second principal surface
42, 42A, 42b, 42C resonance loop
42b, 42Aa, 42Ba, 42Ca loop electrode
42b capacitor
51 first row
52 second row
53 third row
61 display stand
62 jewelry article

The invention claimed is:

1. An auxiliary antenna for expanding a communication range of an antenna of an RFID tag for communication with an antenna of a reader device, the auxiliary antenna comprising:
a plate-shaped or sheet-shaped body; and
a resonance loop group having a plurality of resonance loops having a resonance frequency and coupled to each other through a magnetic field, such that the resonance loop group is configured to expand the communication range between the RFID tag and the reader device,
wherein each of the resonance loops has an antenna area that is larger than an antenna area of an antenna of the RFID tag and equivalent to or larger than an antenna area of an antenna of the reader device,
wherein the plurality of resonance loops is disposed on a first principal surface of the main body and a second principal surface of the main body that is opposite to the first principal surface, with each resonance loop including a loop electrode that is a partially opened annular conductor, and
wherein, when viewed through the main body in a direction orthogonal to the first or second principal surface of the main body, the plurality of resonance loops is arranged such that closed loops are formed relative to the direction by respective pairs of the loop electrodes of the resonance loops on the first principal surface side and the loop electrodes of the resonance loops on the second principal surface side, respectively.

2. The auxiliary antenna according to claim 1, wherein the resonance loop comprises an LC parallel resonance circuit having a resonance frequency in the UHF band.

3. The auxiliary antenna according to claim 1, wherein the plurality of resonance loops is configured with an electric length in an arrangement direction equal to or greater than a ¼ wavelength of a communication frequency corresponding to the resonance frequency.

4. The auxiliary antenna according to claim 3, wherein a portion of the plurality of resonance loops disposed in a center in the arrangement direction have a resonance frequency higher than a portion of the plurality of resonance loops disposed on an end side in the arrangement direction.

5. The auxiliary antenna according to claim 1, wherein each of the plurality of resonance loops has the same inner and outer diameter dimensions of each other and is arranged at regular intervals on the main body.

6. The auxiliary antenna according to claim 5,
wherein resonance loops of the plurality of resonance loops are arranged in first and second rows along a first direction, respectively, and
wherein the resonance loops arranged in the second row are offset relative to the resonance loops arranged in the first row, such the resonance loops arranged in the second row do not align with the resonance loops arranged in the first row in a second direction orthogonal to the first direction.

7. An RFID system comprising:
an RFID tag including an antenna;
a reader device including an antenna; and
an auxiliary antenna configured to expand a communication range between the RFID tag and the reader device, the auxiliary antenna including:
a resonance loop group having a plurality of resonance loops having a resonance frequency and coupled to each other through a magnetic field, such that the resonance loop group is configured to expand the communication range between the RFID tag and the reader device, and
a plate-shaped or sheet-shaped main body,
wherein the resonance loops has an antenna area that is larger than an antenna area of the antenna of the RFID tag and equivalent to or larger than an antenna area of the antenna of the reader device,
wherein the plurality of resonance loops is disposed on a first principal surface of the main body and a second principal surface of the main body that is opposite to the first principal surface, with each resonance loop including a loop electrode that is a partially opened annular conductor, and
wherein, when viewed through the main body in a direction orthogonal to the first or second principal surface of the main body, the plurality of resonance loops is arranged such that closed loops are formed relative to the direction by respective pairs of the loop electrodes of the resonance loops on the first principal surface side and the loop electrodes of the resonance loops on the second principal surface side, respectively.

8. The RFID system according to claim 7, wherein the antenna of the RFID tag is a magnetic field antenna configured to communicate with the auxiliary antenna by magnetic field coupling, and wherein the antenna of the reader device is an electric field antenna configured to communicate with the auxiliary antenna by electric field coupling.

9. The RFID system according to claim 7, wherein the resonance loop comprises an LC parallel resonance circuit having a resonance frequency in the UHF band.

10. The RFID system according to claim 7, wherein the plurality of the resonance loops is configured with an electric length in an arrangement direction equal to or greater than a ¼ wavelength of a communication frequency corresponding to the resonance frequency.

11. The RFID system according to claim 10, wherein a portion of the plurality of resonance loops disposed in a center in the arrangement direction have a resonance frequency higher than a portion of the plurality of resonance loops disposed on an end side in the arrangement direction.

12. The RFID system according to claim 7, wherein each of the plurality of resonance loops has the same inner and outer diameter dimensions of each other and is arranged at regular intervals on the main body.

13. The RFID system according to claim 12,
wherein resonance loops of the plurality of resonance loops are arranged in first and second rows along a first direction, respectively, and
wherein the resonance loops arranged in the second row are offset relative to the resonance loops arranged in the first row, such the resonance loops arranged in the second row do not align with the resonance loops arranged in the first row in a second direction orthogonal to the first direction.

14. An RFID system comprising:
an RFID tag including a magnetic field antenna;
a reader device including an electric field antenna; and
an auxiliary antenna configured to enable communication between the magnetic field antenna of the RFID tag and the electric field antenna of the reader device,
wherein the auxiliary antenna includes a plurality of resonance loops having a resonance frequency that corresponds to a communication frequency for the RFID system, and
wherein the plurality of resonance loops is configured with a length in an arrangement direction thereof that is equal to or greater than a ¼ wavelength of the communication frequency.

15. The RFID system according to claim 14, wherein the resonance loop comprises an LC parallel resonance circuit having a resonance frequency in the UHF band.

16. The RFID system according to claim 14, wherein a portion of the plurality of resonance loops disposed in a center in the arrangement direction have a resonance frequency higher than a portion of the plurality of resonance loops disposed on an end side in the arrangement direction.

17. The RFID system according to claim 14,
wherein the auxiliary antenna includes a plate-shaped or sheet-shaped main body,
wherein the plurality of resonance loops is disposed on a first principal surface of the main body and a second principal surface of the main body that is opposite to the first principal surface, with each resonance loop including a loop electrode that is a partially opened annular conductor, and
wherein, when viewed through the main body in a direction orthogonal to the first or second principal surface of the main body, the plurality of resonance loops is arranged such that closed loops are formed by the loop electrodes of the resonance loops on the first principal surface side and the loop electrodes of the resonance loops on the second principal surface side, respectively.

18. The RFID system according to claim 17, wherein each of the plurality of resonance loops the same inner and outer diameter dimensions of each other and is arranged at regular intervals on the main body.

19. The RFID system according to claim 18,
wherein respective resonance loops of the plurality of resonance loops are arranged in first and second rows along a first direction, respectively, and
wherein the resonance loops arranged in the second row are offset relative to the resonance loops arranged in the first row, such the resonance loops arranged in the second row do not align with the resonance loops arranged in the first row in a second direction orthogonal to the first direction.

20. The RFID system according to claim 17,
wherein the auxiliary antenna includes two main body parts on which pluralities of resonance loops are disposed such that the closed loops are formed between respective resonance loops on the two main body parts,
wherein each of the plurality of resonance loops has the same inner and outer diameter dimensions of each other and are arranged at regular intervals, on the two main body parts, respectively, and
wherein the two main body parts are disposed such that when viewed through in a direction orthogonal to the first or second principal surface, the plurality of the resonance loops arranged a first of the two main body parts is shifted in a plane direction from the plurality of resonance loops arranged on a second of the two main body parts.

* * * * *